US008226867B2

(12) United States Patent
Granger et al.

(10) Patent No.: US 8,226,867 B2
(45) Date of Patent: Jul. 24, 2012

(54) METHOD FOR THE PRODUCTION OF CAPS WITH A HEAT SHRINKABLE SKIRT AND CAPS OBTAINED ACCORDING TO THE METHOD

(75) Inventors: Jacques Granger, Sainte Terre (FR); Andre Luciani, Teche (FR)

(73) Assignee: Alcan Packaging Capsules, Paris (FR)

(*) Notice: Subject to any disclaimer, the term of this patent is extended or adjusted under 35 U.S.C. 154(b) by 1779 days.

(21) Appl. No.: 10/595,764

(22) PCT Filed: Nov. 8, 2004

(86) PCT No.: PCT/FR2004/002862
§ 371 (c)(1),
(2), (4) Date: May 10, 2006

(87) PCT Pub. No.: WO2005/046969
PCT Pub. Date: May 26, 2005

(65) Prior Publication Data
US 2007/0131640 A1 Jun. 14, 2007

(30) Foreign Application Priority Data
Nov. 10, 2003 (FR) .................... 03 13193

(51) Int. Cl.
*B29C 61/02* (2006.01)
*B29C 55/22* (2006.01)

(52) U.S. Cl. .................. 264/150; 264/209.4; 264/209.5

(58) Field of Classification Search .... 264/209.4–209.5, 264/150
See application file for complete search history.

(56) References Cited

U.S. PATENT DOCUMENTS
3,631,899 A * 1/1972 Erickson ................ 138/171
(Continued)

FOREIGN PATENT DOCUMENTS
DE 2320343 10/1974
(Continued)

OTHER PUBLICATIONS
International Search Report for PCT/FR2004/002862 dated Apr. 5, 2005.
(Continued)

*Primary Examiner* — Christina Johnson
*Assistant Examiner* — Xue Liu
(74) *Attorney, Agent, or Firm* — Dennison, Schultz & MacDonald

(57) ABSTRACT

The method comprises a) an extrusion stage wherein a extruded tube made of a thermoplastic material is formed by extrusion with the aid of an extrusion die having a diameter D0, a slit width E0 and a section S0; b) a stage wherein the extruded tube is radially expanded in order to form a radially expanded tube having a diameter D2, a thickness E2 and corresponding section of area S1; c) a truncating stage wherein the expanded tube is broken down into tube portions; d) a stage in which the tube portions are formed in such a way that a heat-shrinkable cap is obtained and in which an axial drawing stage is incorporated, between extrusion stage a) and expansion stage b), at the output of the extrusion die, in order to obtain an axially drawn tube having a diameter D1 which is typically smaller than D0 and D2, and a thickness E1 which is typically lower than E0, such that S0/S1 typically ranges between 2 and 10. The advantages of the invention are as follows: it is possible to obtain caps which are economic, easily heat-shrinkable and which have a stable axial dimension, thereby avoiding any axial distortion, i.e. any axial distortion of the impression.

49 Claims, 12 Drawing Sheets

U.S. PATENT DOCUMENTS

| | | | |
|---|---|---|---|
| 3,752,630 A | | 8/1973 | Takagi |
| 4,576,207 A | * | 3/1986 | Levine et al. ................. 138/177 |
| 4,735,538 A | * | 4/1988 | Reed et al. ........................ 413/5 |
| 4,948,006 A | * | 8/1990 | Okabe et al. ................... 220/611 |
| 4,954,557 A | * | 9/1990 | Iwanami et al. ............... 524/399 |
| 2004/0070104 A1 | * | 4/2004 | Granger ........................ 264/150 |

FOREIGN PATENT DOCUMENTS

| | | | |
|---|---|---|---|
| FR | 805771 | | 11/1936 |
| FR | 988665 | | 8/1951 |
| FR | 2201957 | | 5/1974 |
| GB | 468762 | | 7/1937 |
| GB | 701436 | | 12/1953 |
| GB | 1088551 A | * | 10/1967 |
| GB | 1380397 | | 1/1975 |
| WO | WO 0243945 A1 | * | 6/2002 |

OTHER PUBLICATIONS

Preliminary Search Report for FR 0313193 dated Jun. 24, 2004.

* cited by examiner

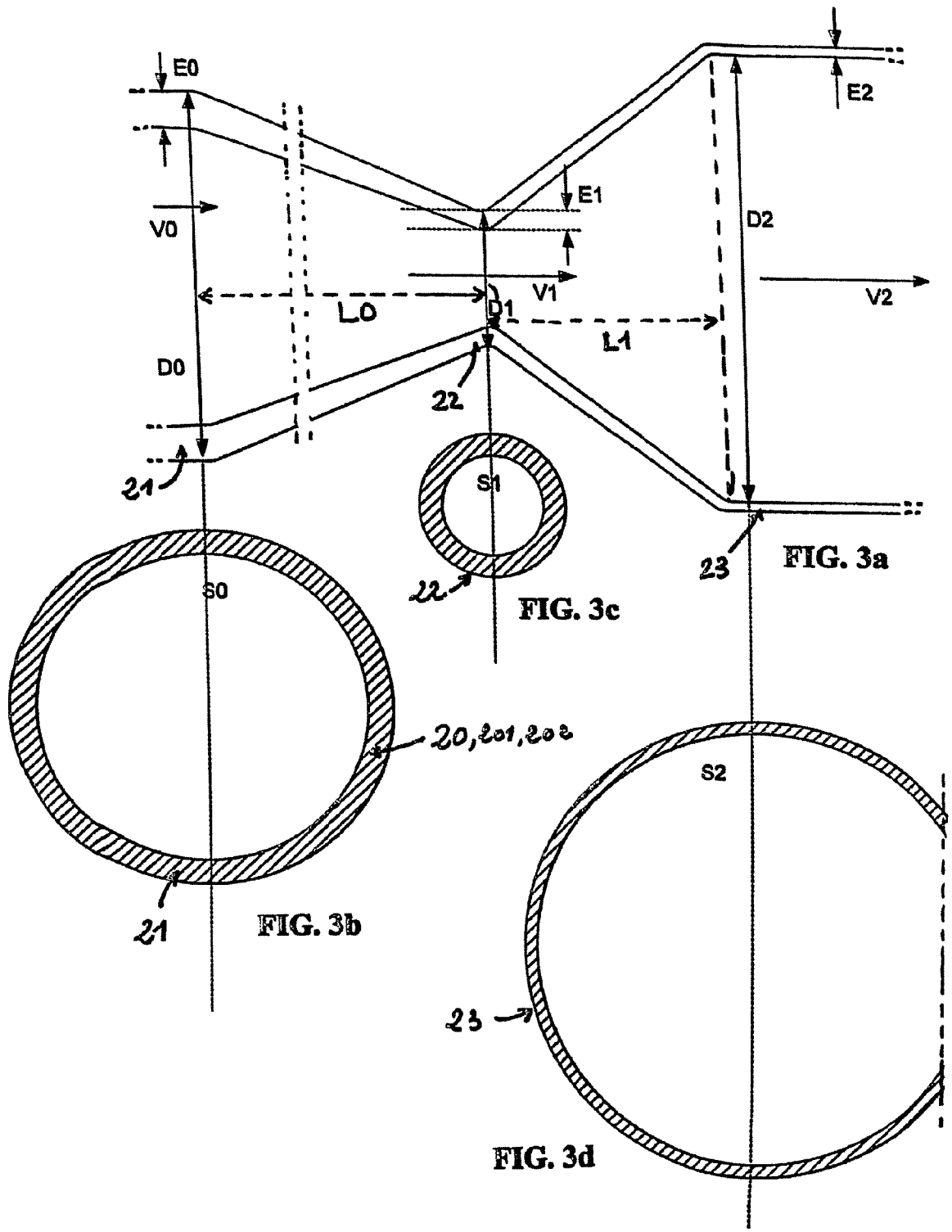

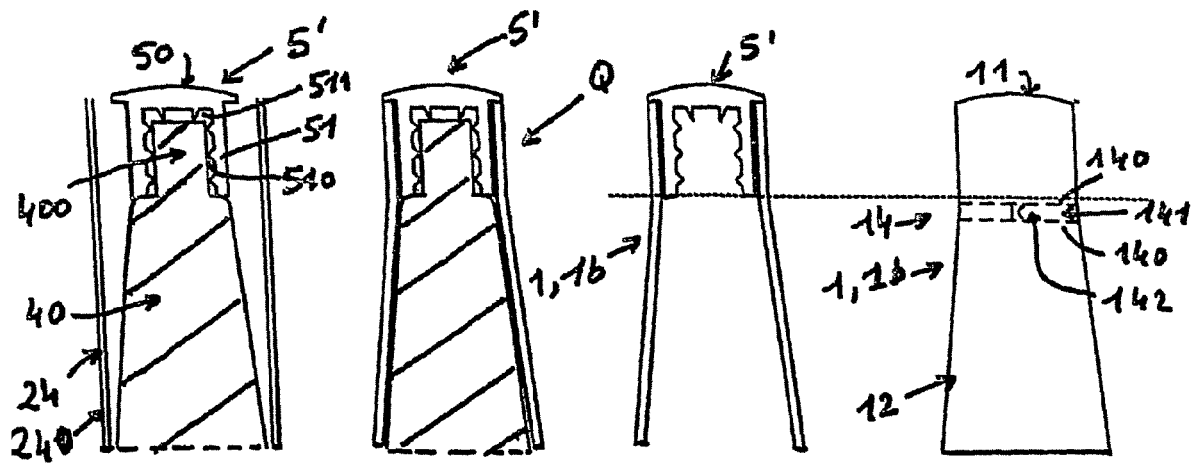
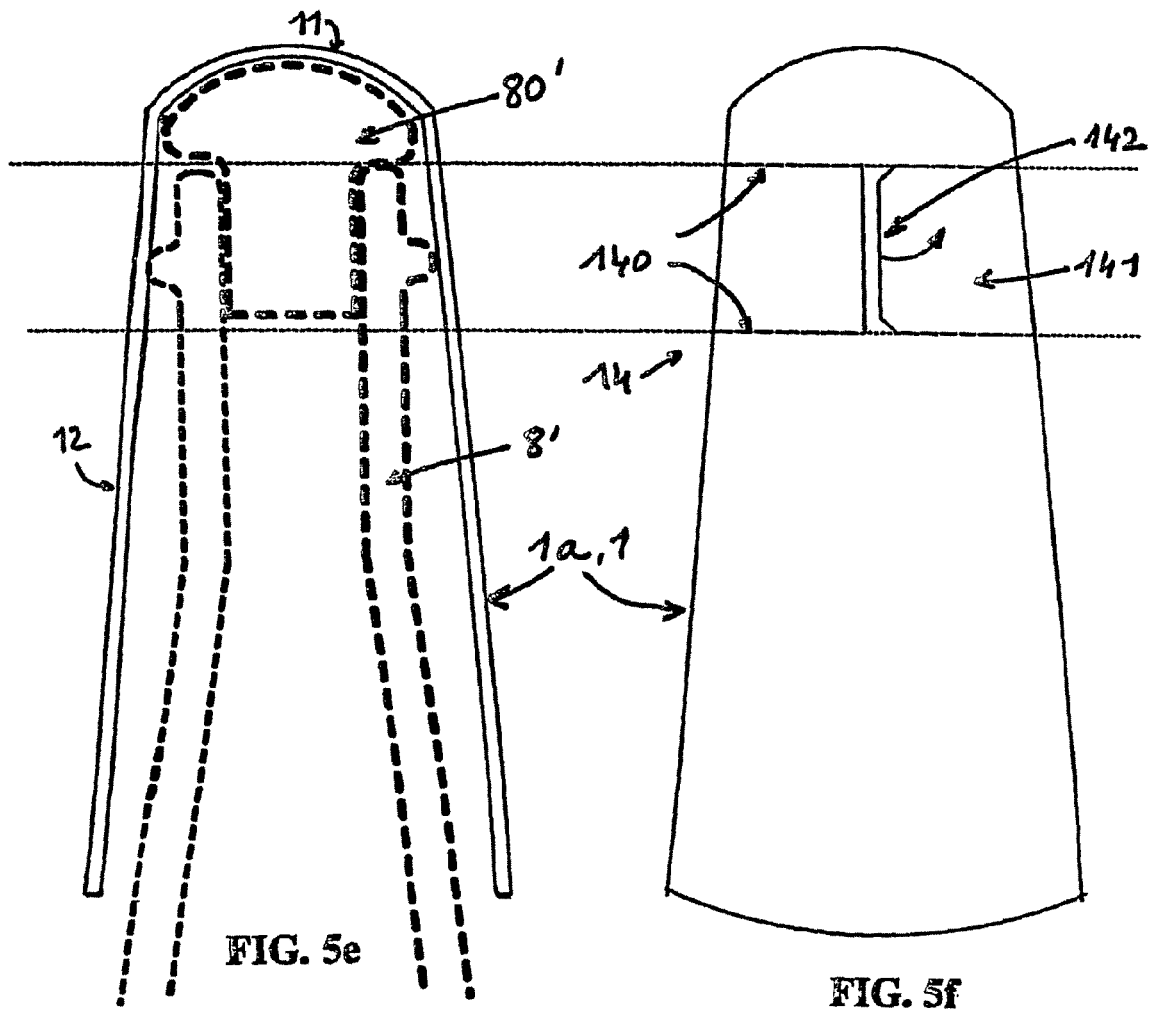
FIG. 5a  FIG. 5b  FIG. 5c  FIG. 5d
FIG. 5e  FIG. 5f

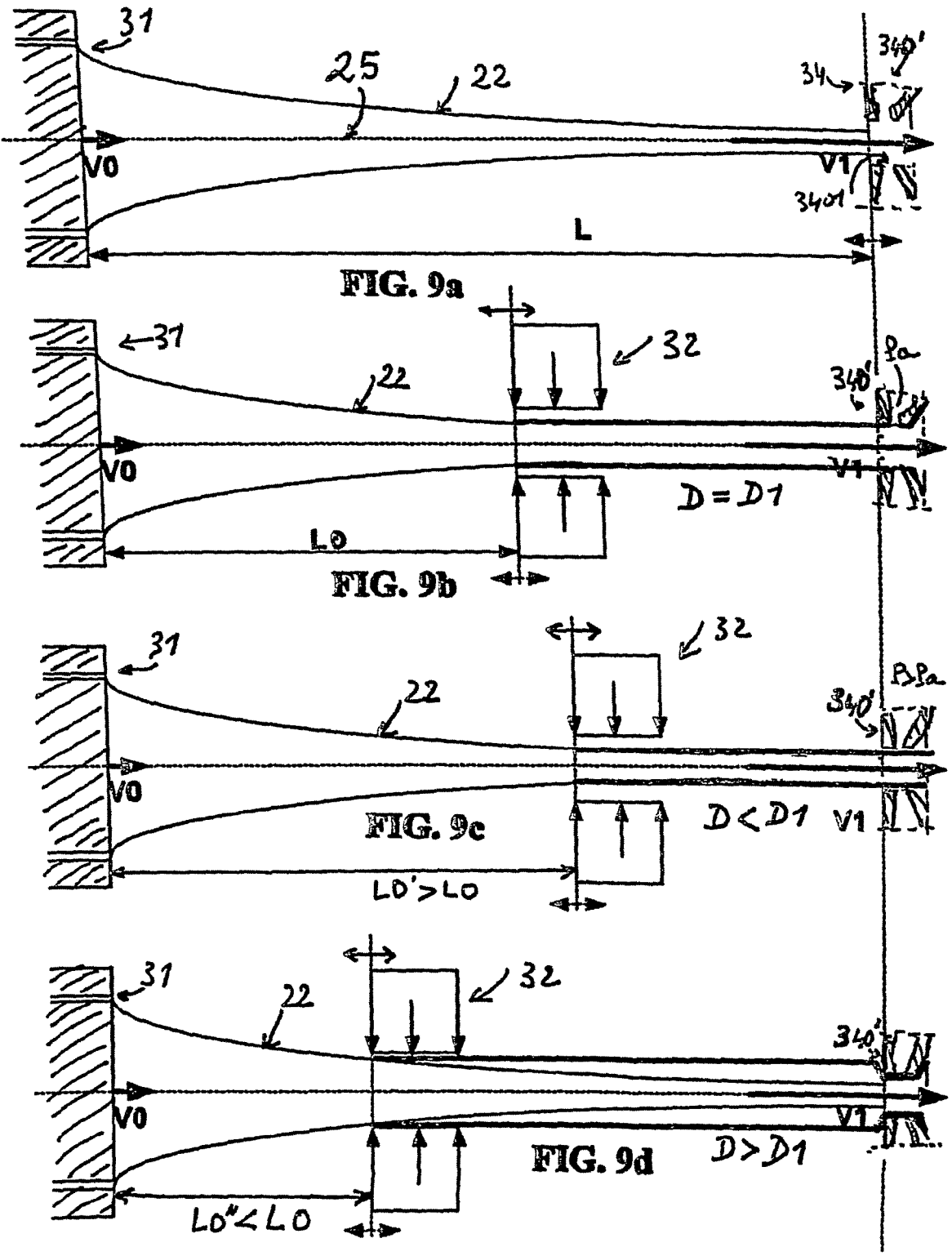

METHOD FOR THE PRODUCTION OF CAPS WITH A HEAT SHRINKABLE SKIRT AND CAPS OBTAINED ACCORDING TO THE METHOD

CROSS REFERENCE TO RELATED APPLICATIONS

This application claims, under 35 U.S.C. §120 and 365, the benefit of priority of the filing date of Nov. 8, 2004 of a Patent Cooperation Treaty patent application, Serial Number PCT/FR2004/002862, filed on the aforementioned date, the entire contents of which are incorporated herein by reference, wherein Patent Cooperation Treaty patent application Serial Number PCT/FR2004/002862 was not published under PCT Article 21(2) in English.

This application also claims, under 35 U.S.C. §119, the benefit of priority of the filing date of Nov. 10, 2003 of French patent application, Serial Number FR 03 13193, filed on the aforementioned date, the entire contents of which are incorporated herein by reference.

BACKGROUND OF THE INVENTION

1. Field of the Invention

The invention relates to the field of closing caps for receptacles or bottles or outer closing for receptacles or bottles previously closed by a cork, a stopper or any other closing means.

More particularly, the invention relates to the field of caps with a heat shrinkable skirt, in other words caps formed from a thermoplastic material that are shrunk onto the neck during crowning by the input of thermal energy, unlike metallic outer closing caps for which the skirt is crimped under the locking ring of the neck during crowning.

More specifically, the invention relates to a new method for the production of caps with a heat shrinkable skirt, outer closing caps and possibly closing caps with a heat shrinkable skirt.

2. Description of Related Art

Heat shrinkable (HS for short) caps have been known for a long time.

Thus, patent FR 805.771 describes the production of a PVC based cap formed by extrusion of a PVC based tube, and then after elongation, expansion of the tube at the exit from the extruder, cooling and cutting of cylindrical tubes into portions forming a heat shrinkable sleeve on the neck of a bottle.

Patent GB 1 105 713 also describes a method for the production of HS caps in which a tube made of a PVC or PS based material is made heat shrinkable by expansion and is flattened and heat sealed transversely at one end so as to close it, and cut off so as to form a flattened cap which, after separation, forms a cap with a welded head that can be placed and heat-shrunk onto a bottle neck.

Patent FR 1 372 805 also describes a method for the production of heat shrinkable tubular sleeves that can be used to seal bottle caps in which a tube is co-extruded in two different types of PE (one relatively meltable and one relatively non-meltable), then cross-linked by irradiation and then expanded.

Patent FR 1 424 731 also describes a method for the production of HS caps in which a portion of a heat shrinkable tube is shrunk onto a template above which a disk is mounted so as to form a heat shrinkable cap for which the head is formed by the disk.

Patent FR 1 441 623 describes a method for the production of a heat shrinkable casing by extrusion of PE, followed by cross-linking by irradiation, and then expansion of the casing.

Patent FR 2 115 137 also describes a method for the production of HS caps in which a blank is formed by cutting it out from a heat shrinkable plastic sheet, and in which a rolled HS cap is formed by welding the side edges by substantially axial overlap. A cap head can also be glued. This cap can be combined with a bottle cork.

Patent FR 2 201 957 also describes a method for the production of HS caps in which a sleeve formed from an extruded tube made of a heat shrinkable and expanded material, is shrunk onto a tapered mandrel on the head of which a stopper made of a heat-formable but non heat shrinkable material is placed.

Patent FR 2 219 080 also describes a HS cap formed on a mandrel by heat shrinkage starting from a PVC or PS tubular part, the end forming the head of the cap being obtained by compaction and compression of a portion with length equal to the length of the tubular part.

U.S. Pat. No. 5 118 460 describes a method for the production of HS caps by moulding. Similarly, patent FR 2 708 513 describes a method for the production of HS caps in which a preform is formed firstly by moulding and is then expanded afterwards.

French patent FR 2 817 193 on behalf of the applicant also describes a method for the production of HS caps that uses an irradiation means.

Known caps or caps with heat shrinkable skirts, and particularly those described in French patent FR 2 817 193, have several disadvantages:

- firstly, they make use of an irradiation device that has an investment cost and an operating cost. Furthermore, even if technically the caps thus manufactured do not introduce any risk for the user, some users will be reticent due to the association of "irradiation" and drink packaging means, even if this is unjustified,
- secondly, it has been observed that there are dimensional stability problems in the axial direction with caps once they have been heat shrunk onto necks, and since these caps are typically printed, these deformations modify the printing,
- furthermore, the hourly productivity of the method has been found to be too low,
- finally, the known method does not have sufficient flexibility to satisfy the diversity of new needs, both concerning sensorial properties of caps such as textures, feel or sonority during use or contact, in particular so as to obtain sensorial properties close to various caps considered as being top of the range on the market.

All these caps also need to be easily opened—without the cap necessarily being provided with easy opening means, either by cutting the top part of the cap with a knife or by "peeling" the cap with a knife from the bottom of the cap depending on habits in each country, being done so without any risk of injury.

BRIEF SUMMARY OF THE INVENTION

According to the invention, the method for the production of caps or caps with a heat shrinkable skirt comprises:

a) an extrusion step in which an extruded tube is formed made of a thermoplastic material by extrusion using a die supplied by an extruder operating at temperature T0 chosen as a function of the softening temperature or the melting temperature Tf of the thermoplastic material, the die having a diameter D0, a slit width or thickness E0 and a corresponding section with area S0, b) a radial expansion step of the extruded tube to form a radially expanded tube with diameter D2, thickness E2 and corresponding section with area S2 due to a radial expansion device, c) a chopping step in which the expanded tube is chopped into portions of tube with an appropriate length, the radially expanded tube pulled by an axial tension means, d) a step to form tube portions in which each portion of tube is placed on a typically tapered conformation mandrel and is formed by heat shrinkage to form a heat-shrunk cap blank, one head also typically being assembled to the blank or formed from the blank, so as to obtain a cap or a heat shrinkable cap provided with a head and a skirt, and typically capable of receiving printing, and is characterized in that a drawing step is included in which the extruded tube is drawn in the axial direction, at the exit from the die of the extruder between the extrusion step a) and the expansion step b), so as to obtain an axially drawn tube with diameter D1 typically less than diameter D0 and diameter D2, with thickness E1 typically less than thickness E0 and with a corresponding section with area S1, such that S0/S1 typically ranges between 2 and 10, the extrusion, axial drawing, radial expansion and chopping steps being carried out continuously while moving so as to obtain caps that are both economic, easily heat shrinkable and with a stable axial dimension thereby avoiding any axial distortion, and particularly any axial distortion of the printout.

It is advantageous to have D0>D1, in particular for reasons of productivity and to obtain a high output rate from the extruder. It is also advantageous to have a relatively low D1 to obtain a relatively high D2/D1 ratio so as to have a cap that can be heat-shrunk. However, there is no reason why D0 and D1 should not be substantially equal.

The S0/S1 ratio is a measurement of axial drawing, the material flow equal to S.V remaining constant, where V is the linear velocity, such that when S decreases the velocity V of the tube increases accordingly.

On the other hand, for a pure radial expansion, only the diameter D increases, the area S and the velocity V no longer being modified.

The instantaneous velocity V was measured at different points on a tube made of thermoplastic material, for example by projection on the extruded tube just at the exit from the extruder, with colored marks at a uniform spacing of $\Delta l_0$ along the axial direction, such that the measurement of $\Delta l_1$ and $\Delta l_2$ using the stroboscopic device provides a means of calculating V1 and V2 knowing V0, the velocity of the material flow or the extruded tube at the exit from the extruder.

This method gives a means of solving the problems that arise. Firstly, it does not use any irradiation device, such that the disadvantage in the previous method developed by the applicant is eliminated, related particularly to the negative image of any type of irradiation with the general public.

Furthermore, it has been observed that the caps obtained with the method according to the invention, and printed, were easily heat shrinkable and were not affected by axial distortion of the printed pattern after shrinkage on the neck.

Finally, the method according to the invention was tested with a large number of different materials and combinations of different thermoplastic materials, both in the form of a single layer extruded material and in the form of dual or three layer co-extruded material, such that it was possible to obtain a wide variety of caps with a different feel, appearance, elasticity, contact sonority with a more or less dull or crystalline sound, flexibility and cuttability with a knife, etc.

Thus, in particular the method according to the invention provides a means of reproducing all types of sensorial impressions achieved with existing caps, either always or at least usually approaching these sensorial impressions, and even enriching them with new impressions, so that it becomes possible to propose "tailor made" products at the request of customers.

DESCRIPTION OF THE FIGURES

All Figures relate to the invention.

FIGS. 1a to 3d relate to the production of tube portions.

FIG. 1a diagrammatically shows the main equipment in the production line (3) for tube portions.

FIG. 1b illustrates the method of production and the production line (3) in operation, in parallel to FIG. 1a.

FIG. 1c shows a partial view illustrating a variant of the method of production and the production line in FIG. 1b. In this variant, a ring is inserted between the die of the extruder and the radial expansion device. In this Figure, this ring is a calibration ring calibrating the axially drawn tube to diameter D1, and a cooling ring provided with water circulation (321).

FIG. 2 shows a partial view of the radial expansion device seen in section along the axial direction common to the extruded tubes, drawn in the axial direction and expanded. This Figures in which the axially drawn tube arrives from the left shows, from left to right, an entry ring with diameter D1 that can be used as a calibration ring, an expansion area provided with orifices (3410) and an inside wall with diameter D2, the assembly formed by cooperation between an internal tubular metallic part and an external chamber (348) provided with vacuum grips (349). The right part of the radial expansion device comprises an auxiliary cooling means, typically formed by spraying or circulation of cold water.

FIG. 3a illustrates the case in which the axial drawing step extends from the exit from the die to the entry to the radial expansion device, the changes in the thermoplastic material during the different production phases of tube portions, the equipment of the production line (3) not being reused, and with the following from left to right:

the extrusion phase that produces the extruded tube at the exit from the die has a diameter D0 as shown in section in FIG. 3b, the axial drawing phase that leads to the axially drawn tube with diameter D1, as shown in section in FIG. 3c, the radial expansion phase that leads to the radially expanded tube with diameter D2 as shown in section in FIG. 3d.

FIG. 3a shows the thicknesses E and the linear velocities V of the plastic material along the axial direction.

FIGS. 4a to 7 illustrate the production of caps (1b) starting from portions of tubes made as illustrated in FIGS. 1 to 3d.

FIGS. 4a to 4d show sectional views along the axial direction (10) that illustrate the different phases of an embodiment of the method according to the invention. In this method, the tube portion is a "long" portion including a lower part that will form the skirt and therefore corresponding substantially to the height H of the cap, and an upper part that will form the head.

Figures 4A, 4B, 4C, 4D:
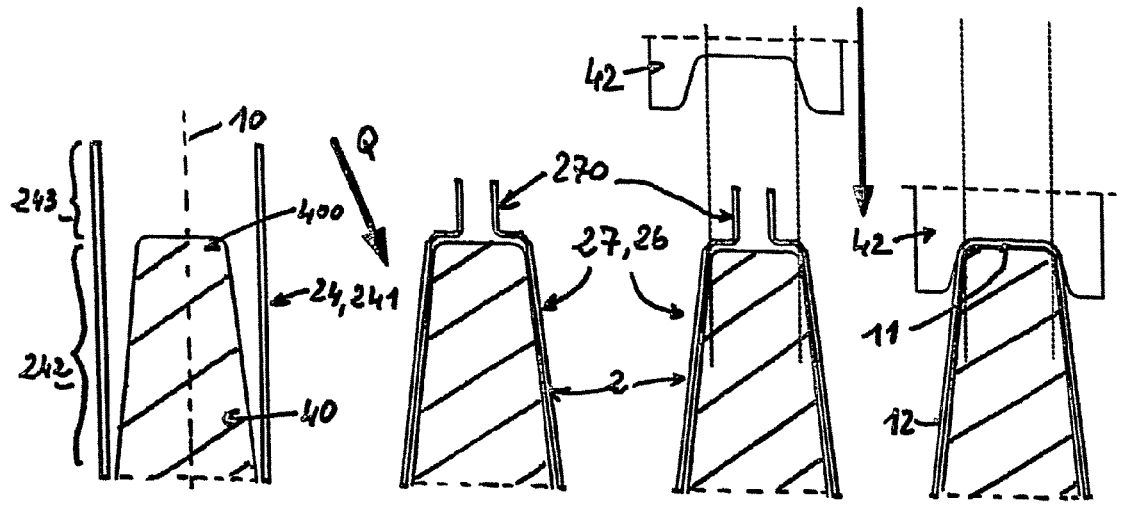

FIG. 4a shows the initial position of the long portion with respect to the conformation mandrel and its head.

FIG. 4b shows the blank (26, 27) after heat shrinkage of the long portion obtained by the input of heat Q, blank that includes an upper part (270) located above the head of the mandrel.

FIGS. 4c and 4d represent formation of the head by compression of the upper part (270) between the head of the mandrel and a matrix with relative displacement to the mandrel along the axial direction (10).

Figure 4E:
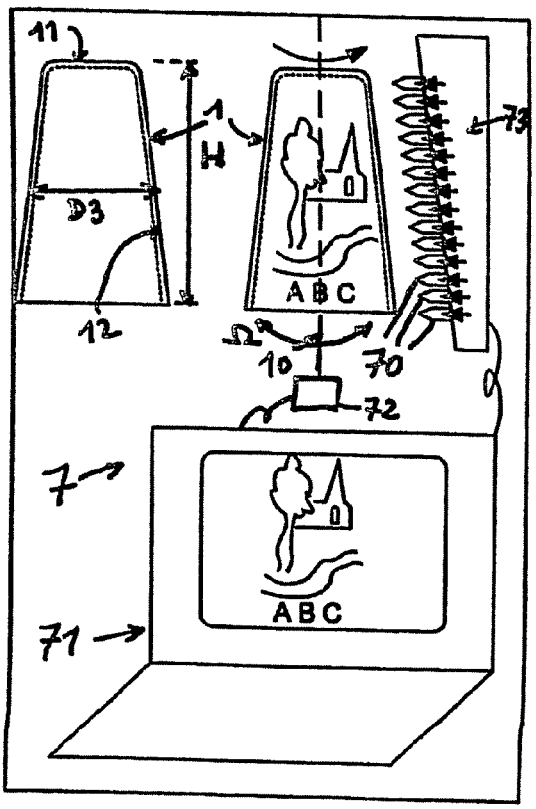

The final cap (1, 1a, 1b, 1c) is shown in FIG. 4e (at the top left) in a side view (the sectional view corresponds to the dashed line), this Figure illustrates printout of a cap by a print device comprising a plurality of print nozzles that project inks onto the cap (1, 1a, 1b, 1c) arranged on a rotating support not shown coupled to a motor (72), typically a stepping motor, each of the print nozzles is provided with a micro-valve which is opened/closed under the control of a computer as a function of the coordinates of the point considered on the printed pattern to be reproduced, namely the height H and the angular coordinate Ω, pattern stored in the computer's memory as shown on the computer screen. The plurality of nozzles forms a head or ramp (73) typically fixed with respect to the rotation axis (10), rotation of the cap and opening/closing of the nozzles being synchronized by the computer. The nozzles may be put in groups of three, each nozzle in the group of three dispensing one primary color (yellow, magenta and cyan), two complementary nozzles being designed to dispense white ink and black ink so as to be able to reproduce a very wide range of colors by trichromatic printing. The density of nozzles per mm will be chosen to be more or less depending on the required fineness.

Figure 4F:
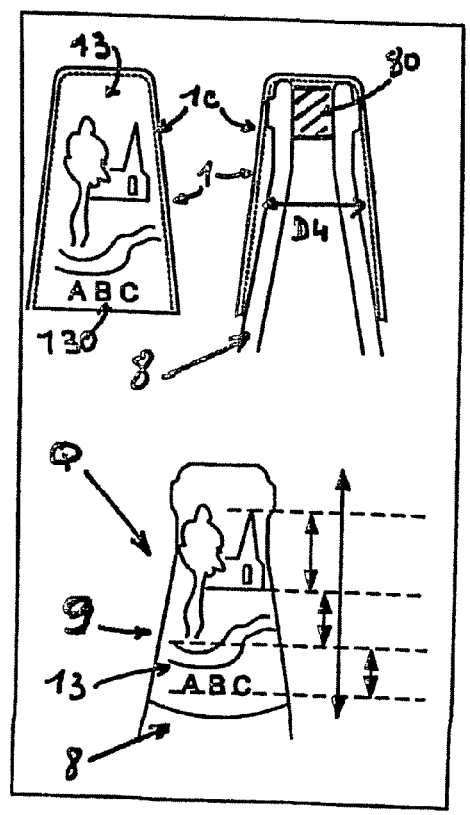

FIG. 4f shows the printed cap obtained as illustrated in FIG. 4e, at the top left. At the top right, it shows the same outer cap (1c) placed on a neck closed by a stopper (80). It shows the outer cap (9) at the bottom, heat-shrunk onto the neck by input of heat Q.

FIGS. 5a to 5d illustrate another embodiment of the cap according to the invention in which the cap comprises an insert comprising a head and a skirt. As illustrated in FIG. 5a that corresponds to FIG. 4a, the insert is placed on the head of the mandrel.

As illustrated in FIG. 5b which corresponds to FIG. 4b, the portion of tube is heat-shrunk onto the skirt of the insert, and the retracted skirt portion is thus solidarised to the insert, possibly using an adhesive layer, so as to form the cap (1, 1b) also shown in section in FIG. 5c. FIG. 5d shows a side view of the closing cap (1b) after providing the skirt with an easy opening means including two typically parallel lines of weakness that delimit an opening tab that is torn during a first opening by pulling on its gripping end.

FIGS. 5e and 5f relate to the case in which the cap is a cap for the neck of a champagne bottle (8') closed by a headed stopper (80').

FIG. 5e shows a sectional view, while 5f shows a side view corresponding to FIG. 5d, the stopper comprising an easy opening means comprising two lines of weakness at a spacing from each other.

Figure 6A:
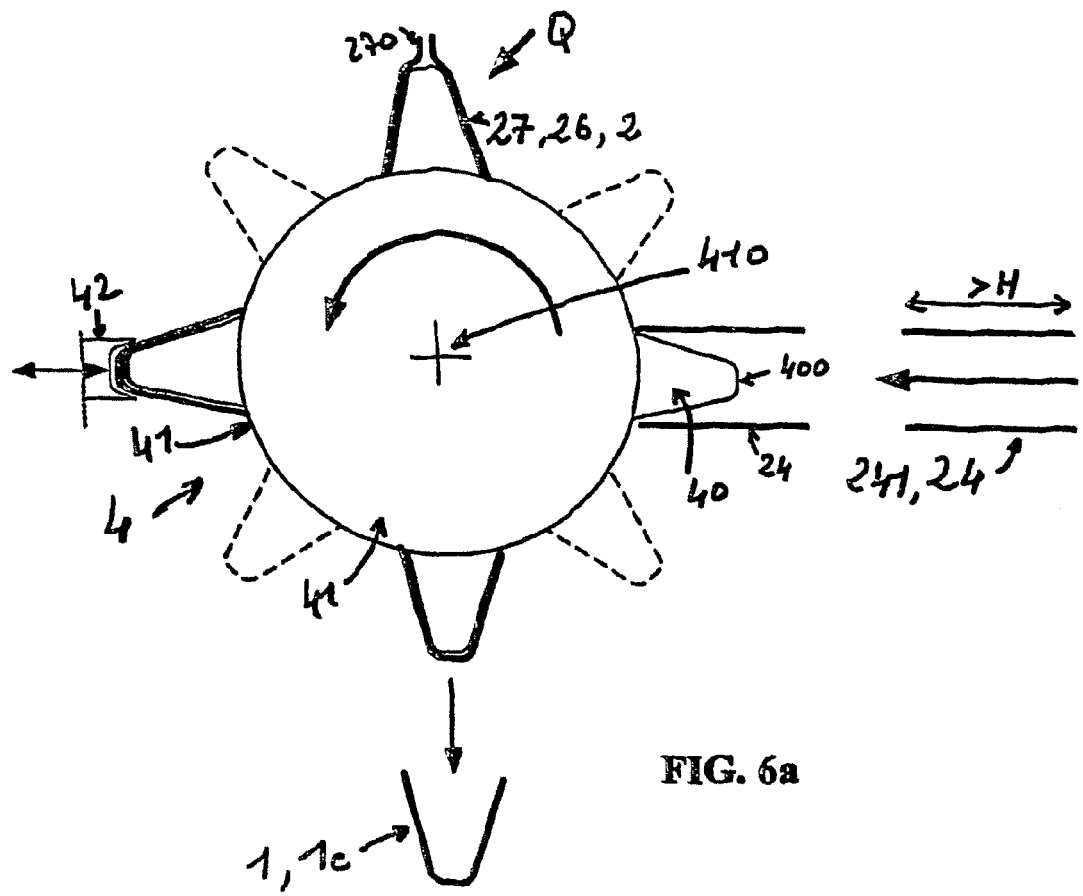
Figure 6B:
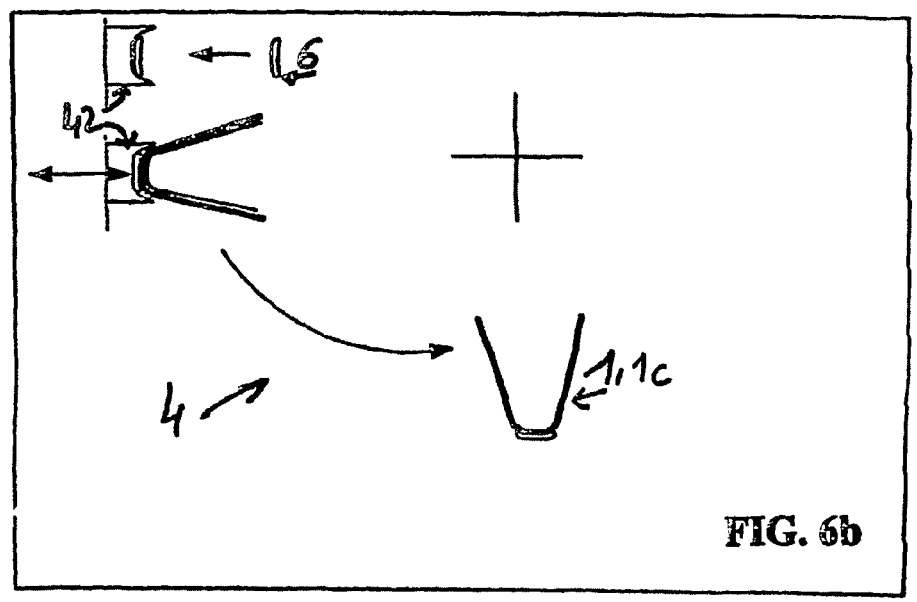
Figure 7:
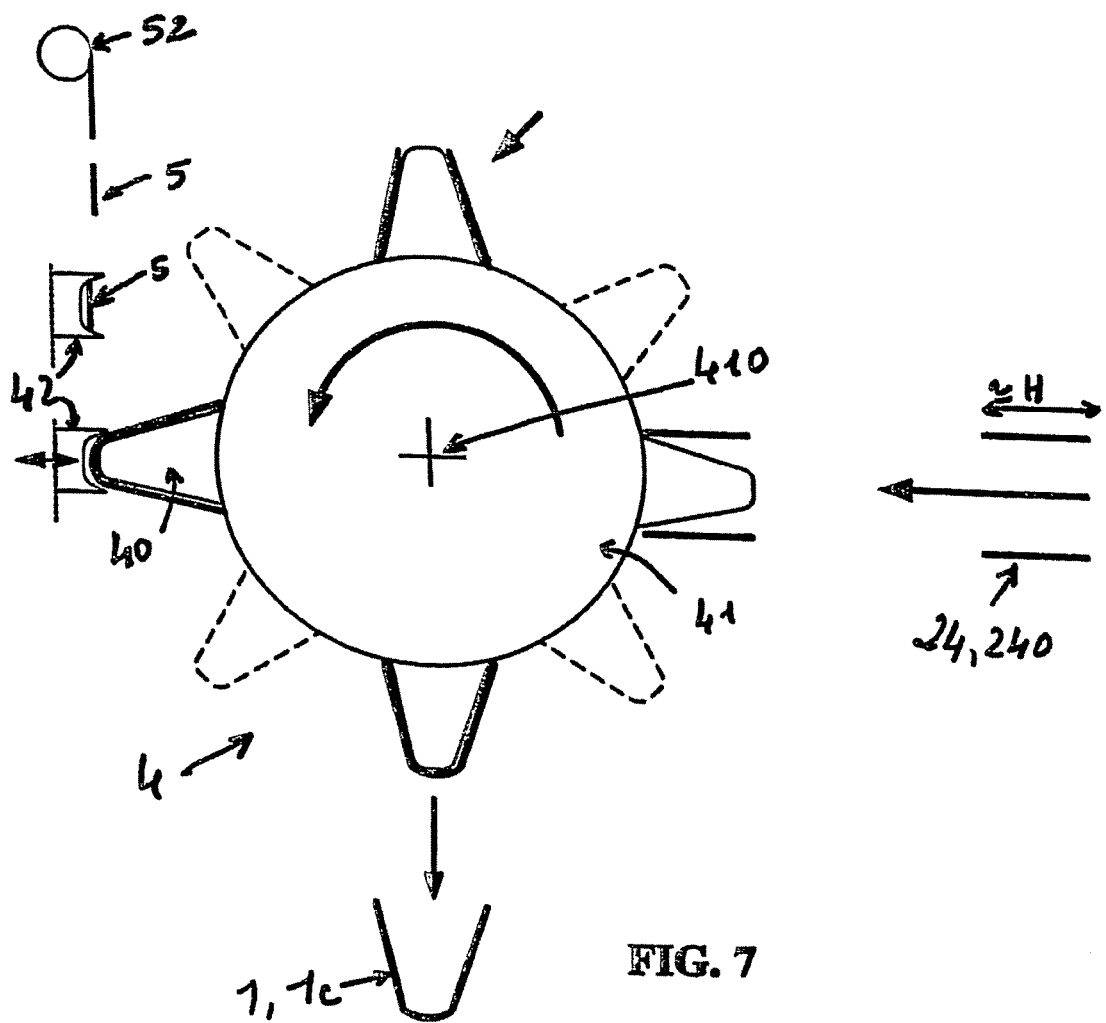

FIGS. 6a to 7 illustrate various embodiments of the method and the corresponding device (4) for shaping tube portions. The device (4) typically comprises a carousel (41) with a vertical or horizontal rotation axis (410), typically including 4 to 8 mandrels, with 4 to 8 corresponding angular positions.

FIG. 6a shows a carousel (4) comprising 4 mandrels and 4 angular positions in solid lines:

in the right position, the long portions of tube (24, 241) are loaded,
in the top position, heat shrinkage takes place by the input of heat Q,
in the left position, the head is molded by compression of the top part (270) between the matrix and the head of the mandrel,
in the bottom position, the cap is ejected.

FIG. 6b is a partial representation of FIG. 6a to illustrate a variant in which an auxiliary part is inserted into the matrix so as to heat seal it onto the head formed during compression at the left position.

FIG. 7 corresponds to FIG. 6a and illustrates a variant in which the short portions of tube (24, 240) are loaded in the so-called right position, and discs are supplied into the matrix in the so-called left position, formed from a strip material.

FIGS. 8a to 8d corresponding to FIGS. 4a to 4d relate to a variant of the method described in FIGS. 5a to 5d to manufacture closing caps (1b), the head of the threaded insert in the case in FIGS. 8a to 8d being fully covered by the layer of thermoplastic material formed by compression of the upper part of the long tube portion (24, 241).

Figures 8A, 8B, 8C, 8D:
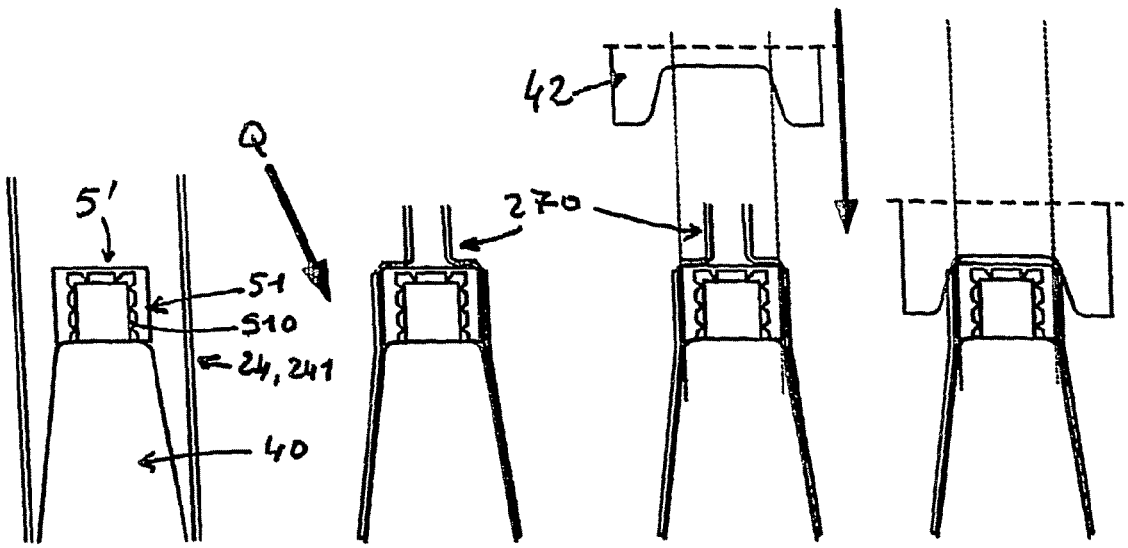
Figure 8E:
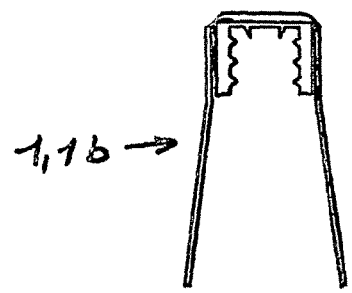
Figures 10A, 10B, 10C, 10D:
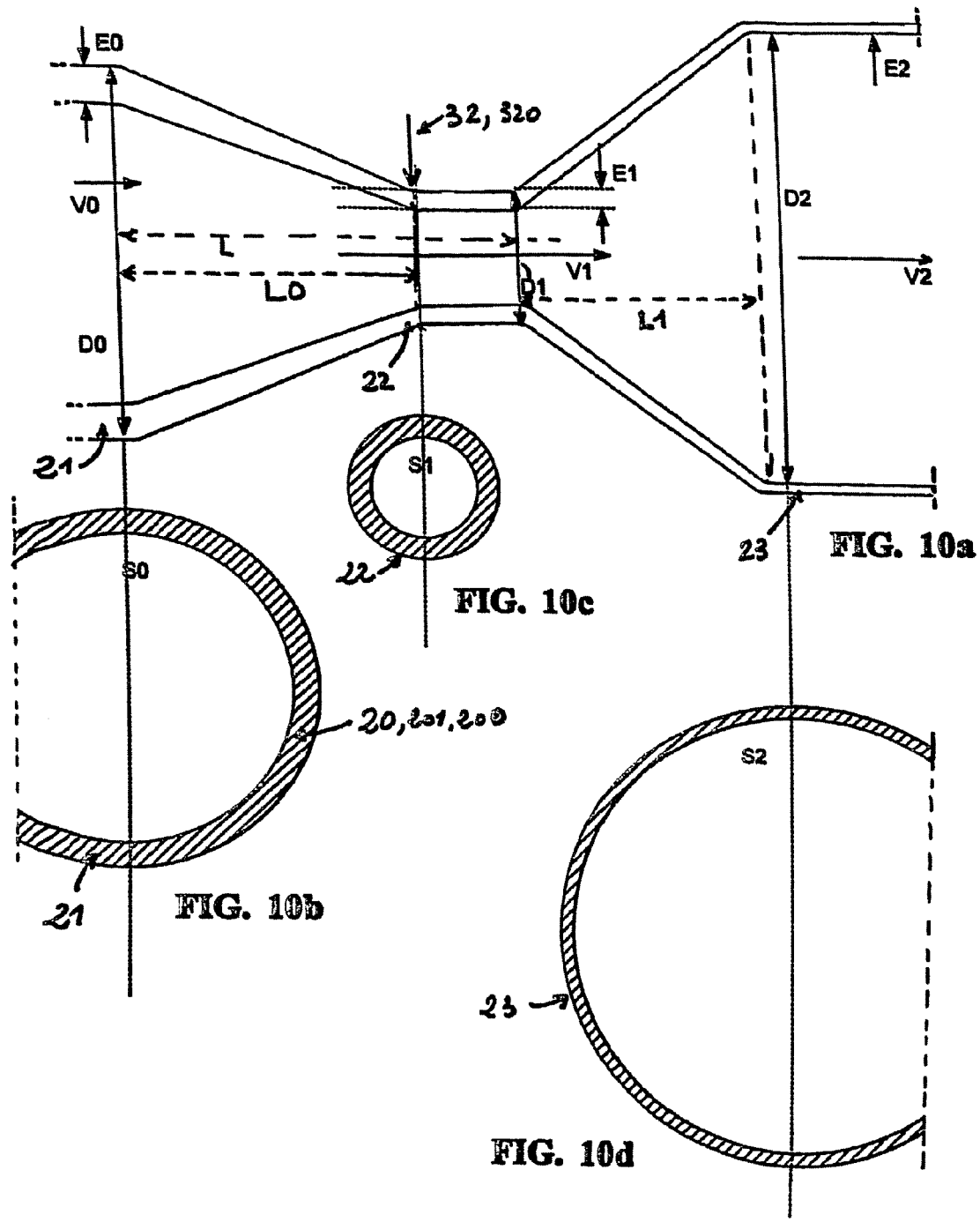

FIG. 8e is a sectional view of the final cap (1b).

FIGS. 9a to 9d are diagrammatic axial sectional views of the axially drawn tube represented between the exit from the die and the radial expansion device.

In FIG. 9a, the axially drawn tube is represented without a cooling device, with a diameter D that decreases substantially along a portion of hyperbola as a function of the axial distance, the radial expansion device being free to move with respect to the die so as to adjust the distance L between the die and the radial expansion device so that the diameter of the axially drawn tube corresponds to the input diameter D1 of the radial expansion device.

In FIGS. 9b to 9d, a cooling means or device is inserted between the die and the radial expansion device, the cooling device fixing the tube diameter equal to the value of the diameter D corresponding substantially to the axial distance L0 in the portion of hyperbola in FIG. 9a.

In FIG. 9b, the cooling device is placed at a distance L0 from the die—or at a distance L-L0 from the radial expansion device such that the diameter D corresponds to the input diameter D1 of the radial expansion device.

FIG. 9c shows the case in which the cooling device has been positioned at an axial distance>L0 which results in D<D1. The axially drawn tube is not forced into contact with the input ring or crown of the radial expansion device, which leads to the appearance of a radial expansion problem.

FIG. 9d shows the case in which the cooling device has been positioned at an axial distance<L0 which leads to D>D1. The axially drawn tube has a diameter significantly greater than the diameter of the ring of annular chamber at the input to the expansion device, and the result is a problem of a high axial force to be applied to the axially drawn tube, the ring or annular chamber then forming a bottleneck for the axially drawn tube, in particular an increase in the axial tension force possibly leading to an undesirable axial drawing during the radial expansion step b).

FIGS. 10a to 10d are similar to FIGS. 3a to 3d and illustrate the case in which the axial drawing step is delimited on the output side by a cooling area in which a cooling means fixes the diameter of the axially drawn tube to a diameter D1.

Figure 2:
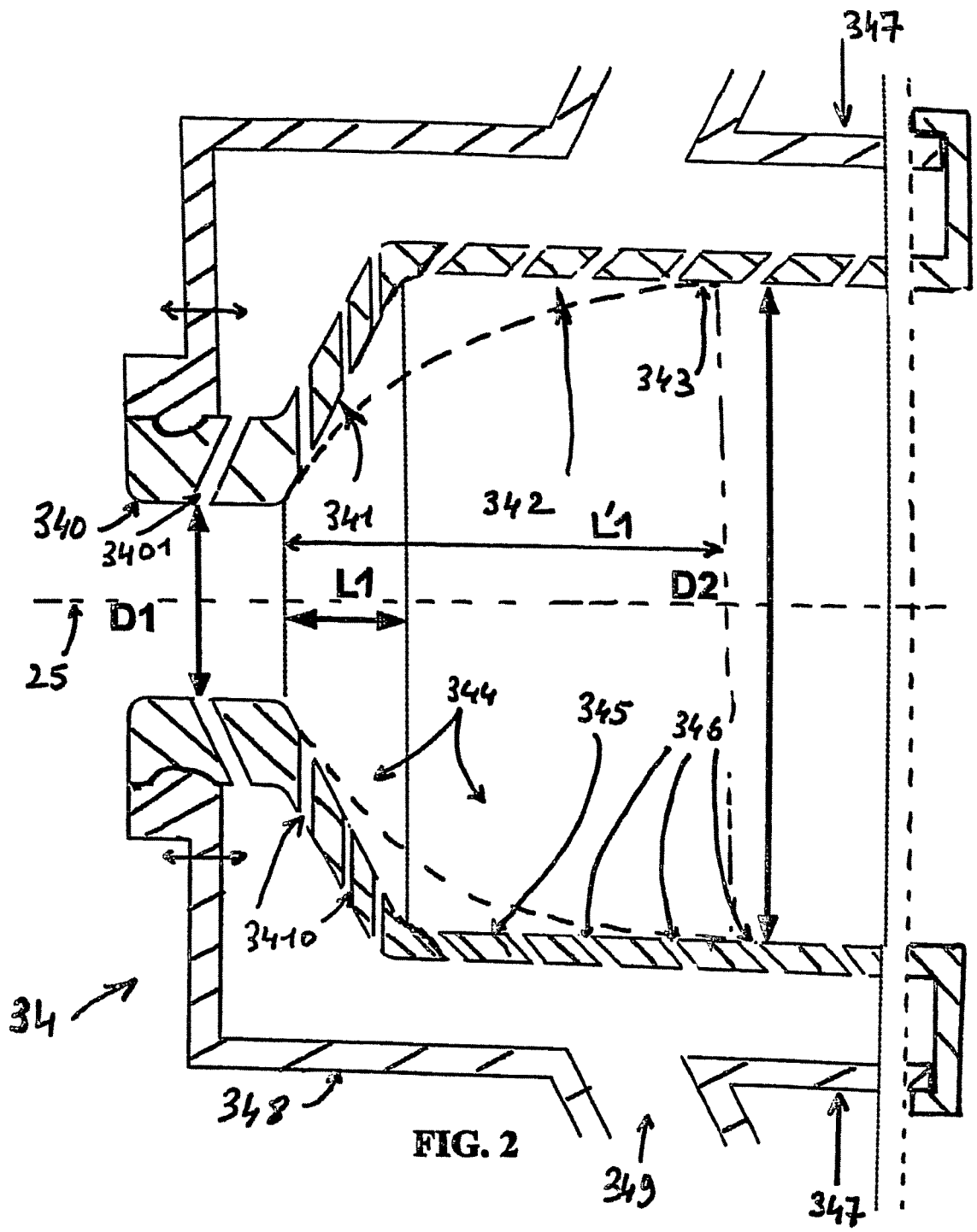
Figure 11:
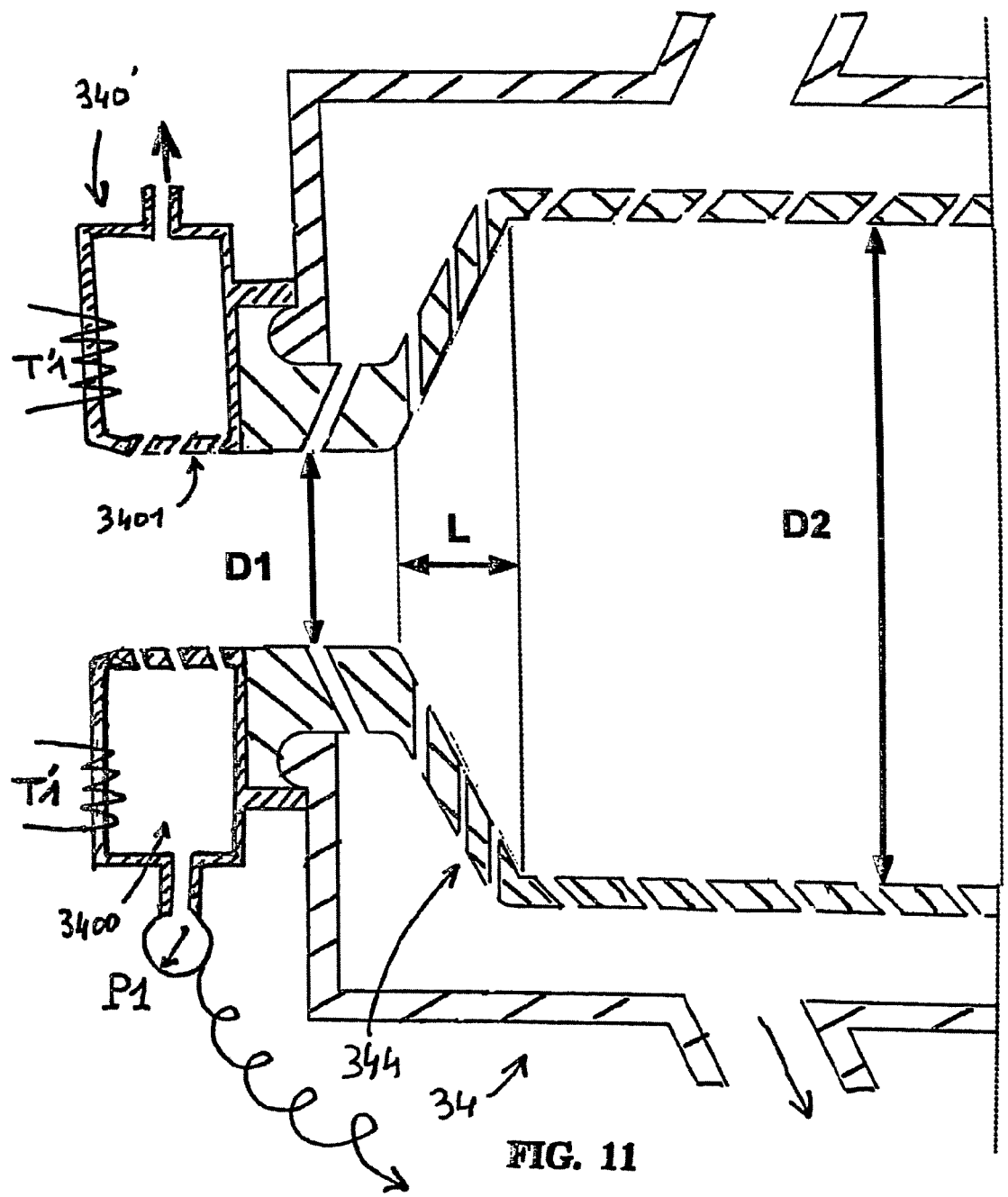

FIG. 11, similar to FIG. 2, illustrates the case in which the radial expansion device comprises an annular chamber as an input ring forming a suction chamber (3400) provided with a perforated tubular portion that is typically removable with respect to the radial expansion device, enabling control of the temperature of the input ring in order to heat or cool the axially drawn tube at the input to the radial expansion device, and a control of the pressure in the suction chamber, so as to evaluate whether or not the axially drawn tube is sucked in by the suction chamber (3400) being forced into contact with the perforated tubular portion.

Figure 12A:
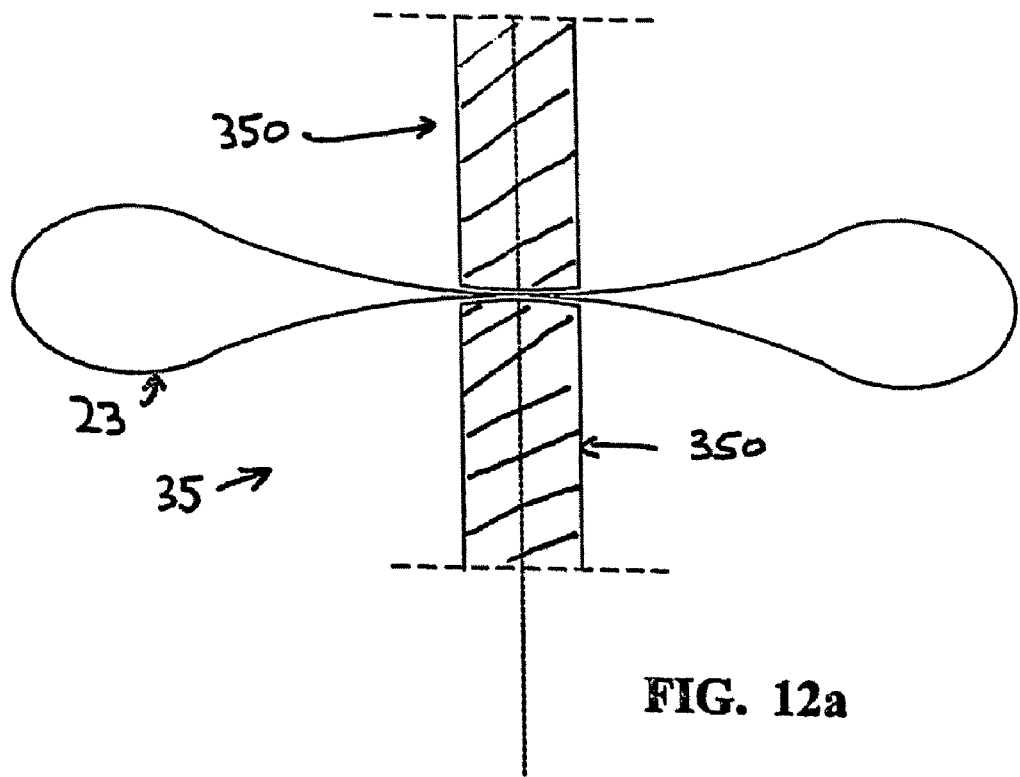
Figure 12B:
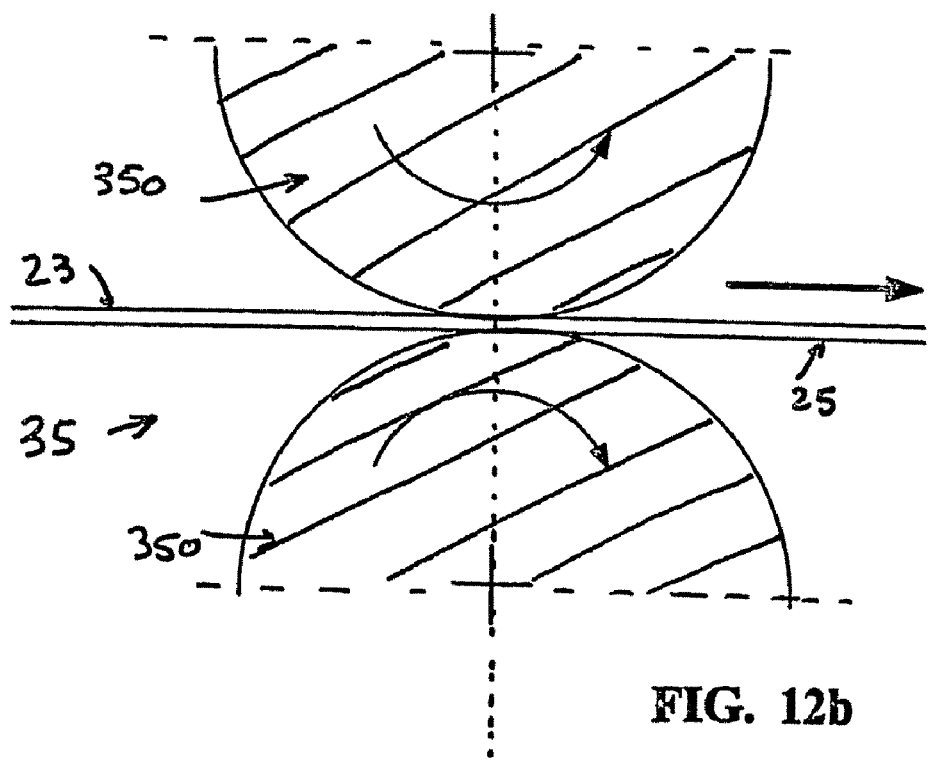

FIGS. 12a and 12b are partial views related to the axial tension means formed by two facing driving rollers.

FIG. 12a is a sectional view in a vertical plane perpendicular to the axial direction.

FIG. 12b is a sectional view in a vertical plane containing the axial direction.

DETAILED DESCRIPTION OF THE INVENTION

According to the invention, the axial drawing step may be delimited on the output side by a cooling zone in which a cooling means lowers the temperature of the axially drawn tube to a temperature T1, the temperature T1 being chosen:

a) to be fairly high so that it is equal to at least the glass transition temperature Tg or the melting temperature Tf of the thermoplastic material, so as to be able to use the subsequent radial expansion step, b) to be fairly low to interrupt the axial drawing step and thus to fix the diameter of the axially drawn tube to a typically predetermined diameter D1.

The temperature T1 may be such that $\Delta T$, equal to T0—T1, varies from 30° C. to 150° C. and typically from 45° C. to 100° C.

Figures 1A, 1B, 1C:
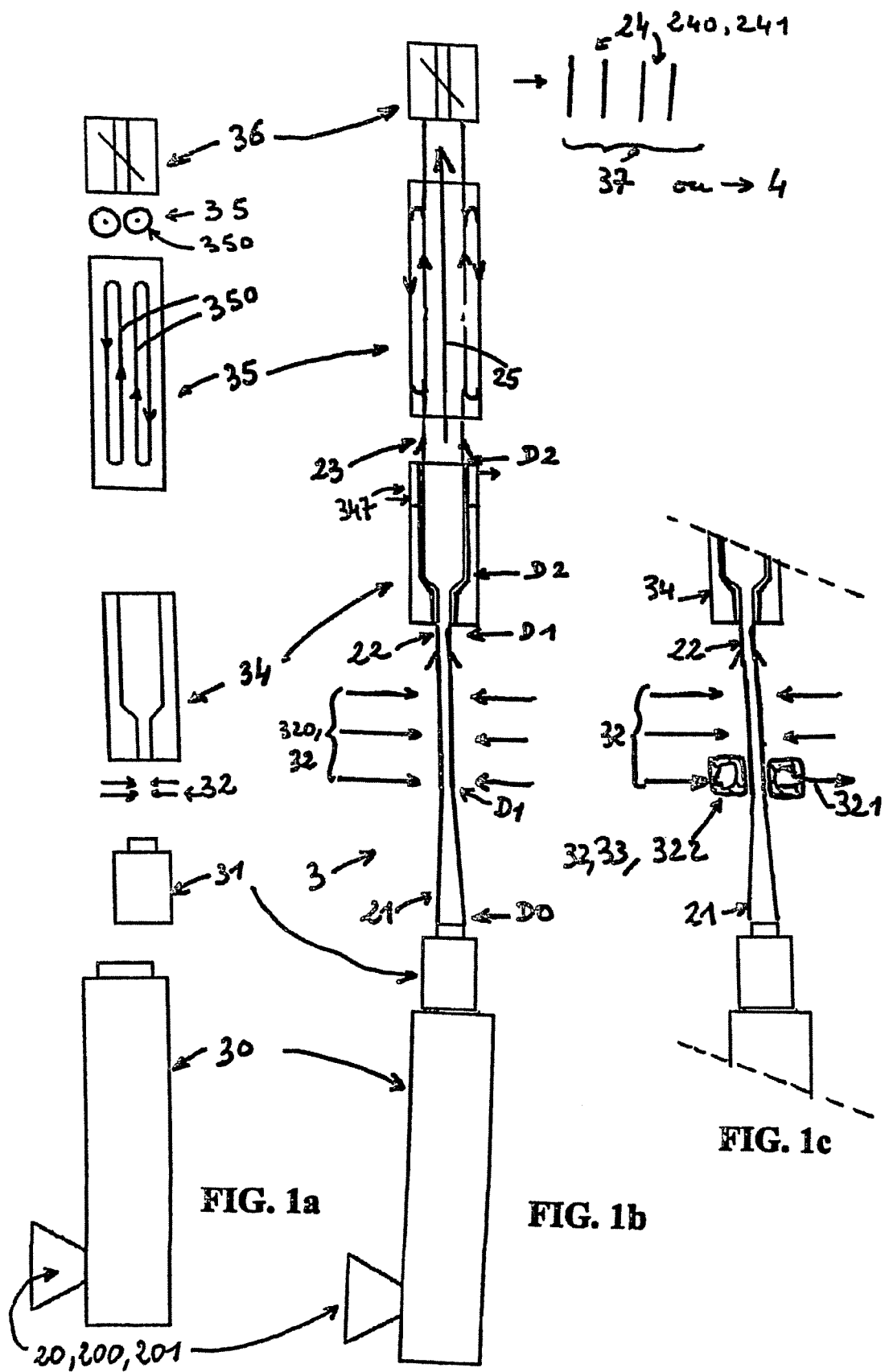

As illustrated in FIG. 1b or in FIGS. 9b to 9d, the cooling means may include an external air or water projection, typically an annular projection, represented by a plurality of parallel arrows in FIGS. 1b, and 9b to 9d.

As illustrated in FIG. 1c, the cooling means may comprise a ring cooled with air or water.

In this case, the ring may include a part with diameter D1 so as to form a calibration ring from which a tube with diameter D1 projects, typically axially drawn and cooled to temperature T1.

According to another variant cooling means (not shown in any figure) the cooling means may include air or water projection inside the axially drawn tube, typically through a pipe passing through the die.

The temperature drop $\Delta T$ obtained in the cooling area, like axial drawing, increases the mechanical properties of the drawn tube which is advantageous in a method in which tension is applied on the tube at the end of the production line. However, since the radial expansion step that follows the axial drawing step creates a large tube deformation, which assumes a low stiffness of the drawn tube at the entry to the radial expansion device, this temperature drop $\Delta T$ must be controlled and limited.

Regardless of the cooling method, the cooling means that is applied after the axial drawing step at the exit from the extruder over the length L0, tends to fix the diameter of the axially drawn tube as illustrated in FIGS. 9a to 9d.

The length L0 corresponding to the axial drawing may typically be between 0.2 m and 2 m. It can be noted that a large number of physical parameters vary along this length L0 and therefore have a gradient, including the diameter D, the thickness E, or the velocity V of the tube.

As illustrated in FIGS. 1b, 1c, 2 and 11, the radial expansion device, supplied on the input side with the axially drawn tube at the temperature T1, may include a radial expansion chamber provided firstly with an expansion area in which the diameter of the axially drawn tube will change from D1 to D2, followed by an inside wall with diameter D2 connected on the input side to the expansion area.

As illustrated in FIG. 2, the radial expansion device may include an entry ring on the input side, typically with diameter D1, so as to have an axially drawn tube with diameter D1 and a regular profile before the radial expansion.

As illustrated in FIG. 11, the entry ring may form an annular chamber typically a ring, with an inside area with inside diameter D1, the inner surface comprising a plurality of vacuum creation orifices, the annular chamber being put under a pressure Pa<P atmospheric, so as to force the axially drawn tube into contact with the inner surface.

This annular chamber can firstly regulate the diameter of the axially drawn tube, by controlling the pressure Pa that tends to increase in the presence of a plating defect, the outside air then being able to pass through the orifices; it can be used firstly to heat the tube if necessary before it enters the expansion area due to a means of heating the annular chamber symbolized by an electrical resistance (T'1) in FIG. 11.

Thus, the temperature of the axially drawn tube can be finely adjusted so as to facilitate its expansion in the expansion area.

The radial expansion can be obtained either by keeping the inside of the tube (21, 22, 23) under pressure, or by keeping the outside of the tube under negative pressure.

The radial expansion can preferably be obtained by keeping the tube under a vacuum, the radial expansion device including a suction inside wall using vacuum creation holes such that the tube with diameter D1 is forced into contact with the inside wall of the expansion area and/or into contact with the inside wall, with inside diameter D2, the temperature T1 being chosen to be as low as possible so as to obtain high heat shrinkage, but high enough to enable the radial expansion.

The inside wall with diameter D2 may be a tubular metallic part, typically a steel, aluminum, copper alloy part, for example such as a bronze or cupro-nickel alloy, the part possibly being a sintered part capable of allowing air to pass through.

This inside wall may be surface treated, either to minimize friction forces between the inside wall and the tube, the inside wall possibly being coated at least partly with PTFE, or to give a particular surface appearance to the tube, typically a satin or "glass polished" appearance, the inside wall comprising a relief or surface roughness capable of creating the appearance.

Typically, the radial expansion step in the expansion area, can result in an increase of the diameter from D1 to D2 or $\Delta D = D2 - D1$ to at least 10 mm, over a distance L1 less than 250 mm and typically less than 100 mm, such that the $\Delta D/L1$ ratio is as high as possible and typically more than 1/25, and thus the radial expansion includes a low or negligible axial expansion component. The upper limit of the $\Delta D/L1$ ratio varies with the thermoplastic material from which the tube is made; it is typically of the order of 3.

Caps according to the invention can be shrunk onto a neck in the radial direction only, with no substantial modification of the axial component depending on the height of the caps due to this separation between prior axial drawing and subsequent radial expansion, such that the axial position of these caps remains unchanged after heat shrinkage and that any image printed on these caps also remains intact depending on the axial direction.

According to the invention and as shown in FIG. 1b, the radial expansion step may include auxiliary cooling due to an auxiliary cooling means so as to have a radially expanded tube at the exit from the radial expansion device, at a temperature T2 typically between 10° C. and 60° C. and typically at ambient temperature, the auxiliary cooling means typically including cooling of the tubular metallic part or the inside wall with diameter D2, the temperature T2 having to be fairly low so that the tube obtained at the output from the radial expansion device can be drawn by the axial tension means without any risk of failure or elongation of the radially expanded tube with diameter D2.

The tubular metallic part and the inner wall may thus have a temperature gradient, with a relatively hot entry diameter D1 and a relatively cold exit diameter D2.

According to the invention, the diameter D0 of the die forming the extruded tube may typically vary from 20 mm to 50 mm, and its slit width or thickness E0 may typically vary from 0.5 mm to 3 mm, so as to have a flow of plastic material from the extruder typically varying from 10 kg to 100 kg of plastic material/hour.

Similarly, the diameter D1 of the axially drawn tube may typically vary from 5 to 20 mm, and its thickness E1 can typically vary from 0.2 mm to 0.6 mm, with a D1/D0 ratio equal to not more than 0.6, and with an E1/E0 ratio equal to not more than 0.6.

The diameter D2 of the radially expanded tube may typically vary from 20 mm to 50 mm and its thickness E2 from 0.05 mm to 0.35 mm, and typically 0.075 mm to 0.15 mm, with a D2/D1 ratio equal to not more than 2 and with an E2/E1 ratio equal to not more than 0.6.

As illustrated in FIG. 9a, the radial expansion device may be placed at a distance L from the die, the radial expansion device typically being free to move along the axial direction, the distance L being chosen particularly as a function of the plastic material, so as to obtain a sufficient axial drawing level and so as to obtain sufficient cooling of the axially drawn tube.

The relative axial mobility of the radial expansion device with respect to the die has been represented by the double arrow "↔".

Similarly, the cooling means may be placed at a distance L0<L from the die, the distance L0 being chosen particularly as a function of the plastic material so as to obtain sufficient axial drawing, the cooling means typically being free to move along the axial direction so as to obtain a regulation of the diameter D1 at the input to the radial expansion device by a displacement ΔL0 of the cooling means around the distance L0. The relative axial mobility of the cooling means with respect to the die has been represented by the double arrow "↔" in FIGS. 9b to 9d.

With the method according to the invention and as illustrated in FIGS. 9b to 9d, the radial expansion device may include the annular chamber under a vacuum, the pressure Pa, and the displacement ΔL0 may be controlled particularly by the pressure Pa, any increase in pressure Pa introducing a negative difference ΔD1 in diameter with respect to the diameter D1 for the axially drawn tube, the negative difference ΔD1 being corrected by a negative displacement ΔL0 so as to increase the diameter of the axially drawn tube by ΔD1.

Furthermore, the displacement ΔL0 may be controlled in particular by the axial tension force Ft applied by the tension means, any increase or positive difference ΔFt in the force Ft typically implying a positive difference ΔD1 in the diameter of the axially drawn tube (with respect to the diameter D1 of the input ring (340, 340'), the axially drawn tube then having a larger diameter than the entry diameter into the radial expansion device, the positive difference ΔFt possibly being corrected by a positive displacement ΔL0 so as to reduce the diameter of the axially drawn tube by ΔD1.

Thus, this embodiment of the manufacturing method according to the invention is very advantageous because it comprises a permanent regulation means leading to excellent production uniformity, but this regulation also means considerably reducing the start-up time of the method and also the adjustment time during a change of plastic material.

According to the invention, the thermoplastic material may also be composed of or may comprise at least one first thermoplastic material with a glass transition temperature Tg equal to at least 40° C., and typically chosen from among PET, PVC, PS, PMMA, or a mix of these materials, or copolymers of PET, PVC, PS, PMMA, so as to obtain thin caps with good mechanical strength alone and that can be used on the crowning line.

However, the thermoplastic material may include or may be composed of at least one second thermoplastic material with a glass transition temperature Tg less than 50° C. and typically less than 10° C., and typically chosen from among polyolefins such as PE, PP, PB or from among ethylene copolymers such as EVA, EMA, EAA, ethylene and propylene copolymers or from among thermoplastic elastomers such as SIS, SEBS, or a mix of these elastomers. If the second plastic material would be used alone, a greater thickness might be necessary to give a good mechanical strength to the cap.

Advantageously, the thermoplastic material may include a mix of the first thermoplastic material and the second thermoplastic material, the mix including at least 50% by volume of the first thermoplastic material, and 10 to 50% by volume of the second thermoplastic material, so as to obtain caps with a range of textures and flexibility depending on the relative content of the first and second thermoplastic materials.

Thus, the invention can be used with a large number of thermoplastic materials, provided that their mechanical characteristics are compatible with the formation of caps. The invention may potentially be applied to any thermoplastic material that can be drawn in the axial direction and can be expanded radially according to the invention.

According to one embodiment of the invention, the thermoplastic material may form or comprise a multi-layer material, the multi-layer material comprising a first layer composed of the first thermoplastic material and a second layer composed of the second thermoplastic material, the multi-layer material possibly including an internal adhesive layer.

Furthermore, all or some of the thermoplastic material may contain a micronised filler typically chosen from among talc, calcium carbonate, barium sulphate, titanium oxide, organic or mineral pigments, nanoparticle clays, so as to color the thermoplastic material.

Thus, due to a wide variety of plastics and fillers, and particularly mineral fillers, the invention offers a virtually infinite number of possibilities concerning sensorial properties of manufactured caps, particularly feel, appearance, "sonority" properties, cuttability with a knife, etc.

In particular, these caps may be very soft to the touch, very different from the normal feel of plastic materials, or their feel may be similar to the feel of tin-based caps. The applicant assumed that this could be due to the undoubtedly heterogeneous mix of two materials with different Tg values.

According to one embodiment of the invention and as illustrated for example in FIG. 7, the tube portion in the chopping step c) may be a so-called "short" tube portion, the appropriate length of the tube portion typically being chosen to be approximately the height H of the cap. In this case, in the forming step d), a disc with a flat or curved edge is supplied that will form the head of the cap, and in which the disc is assembled to the skirt blank, typically by heat sealing using a cavity cooperating with the mandrel, cooperation of the cavity with the mandrel possibly shaping the disc or putting it in relief.

The disc may be obtained by cutting a sheet material, possibly transparent, made of a material chosen from among plastics, metal strips or sheets, paper or cardboard or multi-layer assemblies of these materials. This embodiment is advantageous to obtain composite caps for which the nature of the head is different from the skirt.

The disc may possibly be composed of an excise disc. This disc may comprise any type of system particularly to identify the cap, to monitor and assure traceability of packaged products, and to form an anti-fraud and anti-theft means.

According to another embodiment of the invention illustrated in FIGS. 5a to 5c and in FIGS. 8a to 8e, the disc may be replaced by an insert comprising a head and possibly a skirt, the insert being placed at the upper end of the conformation mandrel, typically before heat shrinking of the tube portion, so as to assemble the insert to the heat-sealed skirt blank, possibly using an adhesive or heat-sealing layer. This insert is typically a molded insert made of a thermoplastic material such that it is possible to have an assembly of the so-called "short" portion at its upper end on the skirt of the insert due to the input of heat Q during the heat shrinkage illustrated in FIG. 5b, or possibly due to additional heat input in the upper part of the cap.

The insert may comprise a thread and be provided with a sealing means so as to form a closing cap (1b). See FIG. 5a.

According to another embodiment of the method according to the invention, and as illustrated in FIG. 6a, the tube portion in the chopping step c) may be a so-called "long" portion, the appropriate length being taken to be greater than the height of the cap, the tube portion comprising a lower part intended to form the skirt of the cap, and an upper part that will form the head of the cap, the head being formed by compression or moulding of the upper part between a die and a head of the mandrel.

In this embodiment, the upper part has a length calculated to provide a sufficient quantity of plastic material to form the head without there being any unnecessary over thickness or under thickness that would make the cap unusable.

However, as illustrated in FIGS. 8a to 8e, it is possible to start from a "long" portion and to form a closing cap (1b) in which the insert is entirely covered by a layer of thermoplastic material output from the portion.

Furthermore, as illustrated in FIG. 6b, an auxiliary part typically forming a pattern, an illustration or an excise means, may be introduced into the cavity before the compression, so as to simultaneously form the head and to assemble the auxiliary part to the head.

It is advantageous to take advantage of the presence of a cavity that can be heated, to fix a complementary element onto the head of the cap without requiring an additional step in the method.

As is normally the case, the caps are usually decorated or printed. According to the invention, the printing may be formed on the tube portion, and/or on the skirt, and/or on the head, and/or on the heat-shrunk skirt blank, either before or after assembling or forming the head of the cap.

The invention makes it possible to print tube portions to the extent that it can avoid subsequent axial deformation, the radial deformation during heat shrinkage on the neck itself being limited by the geometry of the neck, as for example as illustrated in FIGS. 4e and 4f, the average diameter D3 of the skirt of the cap is chosen in relation to the geometry of the neck to be covered and its minimum diameter D4 of the neck, the cap skirt after heat shrinkage in particular being equal to this diameter D4 allowing for the thickness of the cap. It is important that this diameter D4 should be greater or very much greater than the diameter D1 of the tube before the radial expansion, so that the cap is actually well forced into contact with the entire neck to be covered.

To form the printing, inks that can be cross-linked by radiation can be used, typically UV inks such that the printing is typically formed at a temperature below the temperature at which the cap shrinks.

As shown in FIG. 4e, the printing may be formed by using an ink jet print device or by a transfer comprising a plurality of N printing nozzles in parallel along the axial direction or height H, the plurality including a density of nozzles equal to at least 1 nozzle per mm, the device typically being controlled by a computer provided with digital storage means for the printed patterns to be reproduced on the cap so as to be able to print several different patterns simultaneously, to be able to change the printed pattern immediately when necessary and thus to print possibly very short series of caps.

If there are several lines (73) of printing nozzles in parallel, identical or different patterns can be printed in parallel which makes the method particularly flexible and advantageous because printing may be done directly starting from a pattern transmitted by the customer purchasing the caps as soon as the pattern is received.

According to the invention, all or some of the thermoplastic material (20, 200, 201) can be colored in-depth. In this case, the objective is to form either a background color on which the printout is formed, or possibly to form a colored but unprinted cap.

Advantageously, the multi-layer material may include an outside layer made of a plastic material, typically polar or with a high surface energy, so that it can be printed and that leads to an illustration bonding to the outside layer. It may include an inside layer composed of an activatable adhesive so that the cap can be glued locally on the neck, typically by local heating.

As illustrated in FIGS. 5d and 5f, the skirt comprises an easy opening means typically including two lines of weakness at a spacing from each other to form an opening tab provided with a manual gripping end.

Traditionally, the outer closing caps (1c) used on wine bottles closed by a cork stopper, are cut with a knife and do not include any easy opening means. However, the invention includes all types of caps with an easy opening means.

As illustrated in FIGS. 12a and 12b, the axial tension means may include two driving rollers or two belt type pullers.

The applicant has observed that it was possible to apply tension on the radially expanded tube using a pair of rollers, the tube being flattened at the exit from the radial expansion device without deteriorating the appearance of the final cap (1, 1a, 1b, 1c). This tension means is advantageous particularly due to its ease of use and its small size.

Another purpose of the invention consists of heat shrinkable outer closing caps (1c) obtained using the method according to the invention and typically intended for outer closing of previously closed bottle necks, with a height H of between 20 and 100 mm and with a skirt thickness between 0.05 mm and 0.5 mm.

Another purpose of the invention consists of heat shrinkable outer closing caps (1c) obtained according to the invention, with height H between 20 and 60 mm and with a skirt thickness between 0.05 mm and 0.5 mm.

Another purpose of the invention consists of heat shrinkable closing caps (1b) obtained according to the invention. These caps that include an insert as illustrated in FIGS. 5a to 5d, have a height H between 20 and 100 mm and a skirt thickness between 0.05 mm and 0.5 mm for the low part of the skirt not assembled to the insert.

Another purpose of the invention consists of heat shrinkable caps for sparkling wines or pressurized fizzy drinks obtained according to the invention, with a height H of between 60 and 200 mm and with a skirt thickness of between 0.1 mm and 1.0 mm. Such caps are illustrated in FIGS. 5e and 5f.

Another purpose consists of caps with skirts made of a heat shrinkable thermoplastic material, the head possibly being made of the heat shrinkable thermoplastic material, in which the thermoplastic material may include a mix of:

a first thermoplastic material with a glass transition temperature Tg equal to at least 40° C. and typically chosen from among PET, PVC, PS, PMMA or a mix of them or their copolymers, and a second thermoplastic material with a glass transition temperature Tg less than 50° C. and typically less than 10° C. and typically chosen from among polyolefins such as PE, PP, PB or from among ethylene copolymers such as EVA, EMA, EAA or from among ethylene and propylene copolymers, or from among thermoplastic elastomers such as SIS, SEBS or a mix of them.

The mix may include at least 50% by volume of the first thermoplastic material and from 10 to 50% by volume of the second thermoplastic material.

Regardless of the type of cap, the caps according to the invention may comprise a layer of reactivatable thermoadhesive coating on the inside, typically a "hot-melt" layer so as to fix all or part of the caps on the necks.

This means further reinforces the tamperproof nature of the caps according to the invention, making separation of the cap from the neck impossible without at least partial and visible destruction of it.

Another purpose of the invention consists of stacks of caps according to the invention, the stacks comprising a stack of caps or tapered caps, typically printed on their outside surface.

EXAMPLE EMBODIMENTS

A) Manufacturing of Tube Portions

Most tests on manufacturing of tube portions were carried out with the device (3) shown in FIG. 1b. Other tests were carried out with the device shown in FIG. 1c.

In these tests, an extruder with a maximum flow of 50 kg/h of a thermoplastic material was used, for which the "length/diameter" ratio of the screw was equal to 30.

An annular die or extrusion head with a diameter D0 equal to 27 mm was used, the formed extruded tube having a thickness E0 of 0.7 mm and a temperature T typically varying from 190° to 240° C.

The radial expansion step was carried out over the axial distance L0 that typically varies from 0.3 m to 0.6 m, at the exit from the annular die. The axial drawing step was then blocked using blown air as the means of cooling the axially drawn tube, such that the axially drawn tube is at a temperature varying from 140° C. to 160° C. and its diameter is equal to the diameter D1 of the entry ring (340, 340') to the radial expansion device. This cooling means was axially mobile so that the diameter of the axially drawn tube can be adjusted to the diameter D1 of the entry ring (340, 340').

The thickness E1 of this drawn tube at the entry of the radial expansion device was 0.35 mm, which corresponds to an S0/S1 ratio of 3.86, which results in a relatively high axial drawing ratio.

A radial expansion device with a length of 500 mm was used, free to move axially, and separated from the die by a distance L typically varying from 0.5 m to 1 m and provided with an entry ring with diameter D1 equal to 14 mm and an inner wall with an inside diameter D2 equal to 35 mm.

The radial expansion device shown in FIG. 2 was used, or preferably the device shown in FIG. 11 with its expansion area extending over the distance L1 equal to 35 mm, such that the $\Delta D/L1$ ratio is equal to $0.6=(35-14)/35$.

Tests were also carried out with a nearby device with the inside profile shown in dashed lines in FIG. 2, and in which the expansion area extends over the distance L'1>L1, the distance L'1 being equal to 80 mm. In this case, the ratio $\Delta D/L1$ is equal to $0.26=(35-14)/80$.

For the tests, a vacuum of 0.35 bars was maintained using the vacuum connector (349).

The device was cooled with water, such that the radially expanded tube exits from the device at ambient temperature, typically at approximately 25° C., which corresponds to a temperature drop of the tube of about 120° C. between the inlet and the outlet of the radial expansion device.

The thickness E2 of this radially expanded tube was 0.14 mm.

The axial tension means used is a system with two rollers or possibly with two belt type pullers that rotate in opposite directions and when they move towards each other, they push the expanded tube over a sufficient axial length to apply a minimum pressure on the surface of the expanded tube so as to not mark the tube surface.

This axial tension system, like the chopping means (36) that follows it, are devices known in themselves.

Typical procedure for a test on the laboratory device used:

| Element | Flow/Velocity | Diameter D | Thickness E | Temperature |
|---|---|---|---|---|
| Extruder | D = 4.4 kg/h | | | |
| Extruded tube | | D0 = 27 mm | E = 0.70 mm | T0 = 200° C. |
| Drawn tube | | D1 = 14 mm | E1 = 0.35 mm | T1 = 150° C. |
| Expanded tube | | D2 = 35 mm | E2 = 0.14 mm | T2 = 25° C. |
| Tension | V = 5 m/min. | | | |

Tests were also carried out on an industrial line with an extruder flow D and a tension velocity V 5 times greater.

60 mm "long" portions of tubes (24, 241) were cut in order to manufacture outer closing caps with a heat shrinkable skirt (1c) according to the method illustrated in FIGS. 8a to 8e.

B) Nature of the Thermoplastic Material Used in the Tests

A large number of tests were carried out. The compositions are usually mixed:

based on a so-called first thermoplastic material PMT, based on a so-called second thermoplastic material SMT, These compositions (by % weight) may also include mineral fillers CM or various fillers or additives.

The following products were used for these non-limitative tests:

as the first plastic material PMT:

A=crystal polystyrene (Lacqrene 1811 made by Atofina)

B=copolyester (Embrace 22608 made by Eastman)

as a second plastic material SMT:

C=EVA (Escorene UL00218CC3 made by Exxon Mobil Chemical)

D=EVA (Evatane 1020 VN5 made by Atofina)

E=SEBS (Kraton G1652 made by Shell)
F=SIS (Kraton D1111 made by Shell)
G=PE (Engage 8400 made by Dupont Dow Elastomer) as a mineral filler
H=talc (10MOOS made by Luzenac)
I=titanium oxide white pigment

| Test No. | PMT nature & % | SMT nature & % | CM nature & % |
|---|---|---|---|
| 1 | A = 18%<br>B = 50% | D = 18%<br>E = 14% | |
| 2 | A = 34%<br>B = 34% | C = 16%<br>E = 16% | |
| 3 | A = 28.8%<br>B = 28.8% | C = 13.6%<br>E = 13.6% | H = 12.1%<br>I = 3.1% |
| 4 | A = 34.5%<br>B = 34.5% | C = 15.5%<br>F = 15.5% | |
| 5 | A = 29%<br>B = 29% | C = 13%<br>F = 13% | H = 13%<br>I = 3% |
| 6 | A = 34%<br>B = 34% | E = 16%<br>G = 16% | |
| 7 | A = 28.8%<br>B = 28.8% | E = 13.6%<br>G = 13.6% | H = 12.1%<br>I = 3.1% |
| 8 | A = 34.5%<br>B = 34.5% | D = 15.5%<br>F = 15.5% | |
| 9 | A = 29%<br>B = 29% | D = 13%<br>F = 13% | H = 13%<br>I = 3% |
| 10 | A = 34.5%<br>B = 34.5% | E = 31% | |
| 11 | A = 29%<br>B = 29% | E = 26.1% | H = 13%<br>I = 2.9% |
| 12 | A = 17.8%<br>B = 50% | D = 17.8%<br>E = 14.4% | |
| 13 | A = 17.2%<br>B = 48.3% | D = 17.2%<br>E = 13.8% | I = 3.5% |
| 14 | B = 100% | | |

C) Manufacturing of Caps from Tube Portions

A device (4) for forming tube portions was used consisting of a carousel (41) rotating about its axis (410) and provided with four conformation mandrels typically arranged at 90° from each other, as shown in FIGS. 6a, 6b and 7.

The method was used as illustrated diagrammatically in FIG. 6a, according to a first embodiment of the invention. In this particularly economic method, the head of the cap is formed from a so-called long tube portion that leads to a retracted cap blank (27) for which the upper part (270) forms a reserve of material to form the cap head due to compression of a mold.

Starting from a tube portion with the same dimension, caps of various dimensions were manufactured simply by varying the dimensions of the conformation mandrel and the cavity for formation of the head.

A first variant of this first embodiment illustrated in FIG. 7 was also used. According to this variant, the starting point is a tube portion called a short portion and in this case the head of the cap is formed from a disc that is then typically made from a material different from the material from which the skirt is made.

A second variant of this first embodiment illustrated in FIG. 6b was also used. According to this variant, whenever a compression cavity is used, it is possible to incorporate another element into the head of the cap that can be fixed hot and/or by axial compression.

Once formed and typically printed, the outer closing caps (1c) were used as such.

The method according to the invention was also used to also form caps according to FIGS. 5e and 5f that are provided with first opening means as illustrated in FIG. 5f.

The method according to the invention was also used to form screw closing caps (1b).

According to a first variant of the method illustrated in FIGS. 5a to 5d, a "composite" closing cap was formed in which the head of the cap (1b) is formed by the head of the threaded insert.

According to a second variant of the method illustrated in FIGS. 8a to 8e, the insert was completely masked on the outside by the cap element formed starting from the portion.

D) Results Obtained

Regardless of the type of cap (1b, 1c), the results obtained relate to:
1)—the ease of manufacturing and particularly the expandability,
2)—properties of the cap in terms of:
a) shrinkability: particularly when crowning
b) mechanical properties: rigidity or stiffness of the cap, ease of tearing the cap, etc.
c) feel or "touch"
d) cuttability with a knife, particularly in the case of outer closing caps (1c).

| | | | Properties of caps | | |
|---|---|---|---|---|---|
| TEST | Manufacturing | Shrinkage | Mechanical properties | Touch or feel | Cuttability |
| 1 | Easy | Good | Good | Good | Good |
| 2 | Expansion more difficult | Good | Stiffer caps | Dry feel | Good |
| 3 | Expansion more difficult | Good | Stiffer caps | Dry feel | Good |
| 4 | Easy | Lower shrinkage | More flexible caps | Good feel | Good |
| 5 | Easy | Lower shrinkage | More flexible caps Easy to tear | Good feel | Good |
| 6 | Easy | Lower shrinkage | More flexible caps Easy to tear | Good feel | Good |
| 7 | Easy | Lower shrinkage | More flexible caps Easy to tear | Good feel | Good |
| 8 | Easy | Lower shrinkage | Caps easy to tear | Good feel | Good |
| 9 | Easy | Lower shrinkage | Caps easy to tear | Good feel | Good |
| 10 | Expansion more difficult | Good | Slightly stiff caps | Slightly drier feel | Good |
| 11 | Expansion more difficult | Good | Slightly stiff caps | Slightly drier feel | Good |
| 12 | Easy | Good | Good | Good feel | Good |
| 13 | Easy | Good | Good | Good feel | Good |
| 14 | Easy | Good | Cap more rigid | Drier feel | More difficult |

Results for tests 2 to 14 should be considered in relation to test 1.

The invention has important advantages:
firstly, the method according to the invention is an economic method. This method does not require large investments and in particular does not require the presence of an irradiation device. It also enables excellent productivity and it requires a relatively small amount of plastic material per cap, and use of current plastic materials.

secondly the method according to the invention can be used to make all types of caps including closing caps (1b), outer closing caps (1c), or caps for overcapping of sparkling wines, furthermore, the method according to the invention provides a means of obtaining decorated or printed caps for which the illustration is not affected by any axial distortion during shrinkage of the cap on the neck, finally on request, the invention can be used to obtain a wide variety of caps, as illustrated non-limitatively by the example embodiments, including caps that have a feel and touch similar to metallic tin-based caps, such that the method can potentially satisfy any type of request, to satisfy personalized and individual needs.

We claim:

1. A method for the production of caps having a heat shrinkable skirt comprising:
   (a) extruding a thermoplastic material to form a tube having a first diameter $D0$, a first thickness $E0$, and a first cross-sectional area $S0$;
   (b) drawing the tube in an axial direction, the axially drawn tube having a second diameter $D1$ less than the first diameter $D0$, a second thickness $E1$ less than the first thickness $E0$, and a second cross-sectional area $S1$, the ratio of the first cross-sectional area to the second cross-sectional area between about 2 and 10;
   (c) providing a cooling assembly and cooling the drawn tube in the cooling assembly;
   (d) providing a radial expansion assembly having an annular vacuum chamber and increasing the diameter of the drawn tube in the radial expansion chamber to form a radially-expanded tube having a third diameter $D2$ greater than the first and second diameters;
   (e) passing the radially-expanded tube through an axial tension assembly;
   (f) segmenting the radially-expanded tube into portions of desired length;
   (g) forming a cap blank by heat shrinking one of the portion on a mandrel; and
   (h) providing a head on the cap blank to form a cap having a head and a skirt.

2. The method according to claim 1, in which a cooling zone is provided subsequent to drawing the tube in an axial direction, the axially drawn tube at a first temperature $T0$, the cooling zone having a cooling assembly to lower the temperature of the axially drawn tube to a second temperature $T1$, the second temperature being: (a) about equal to at least the glass transition temperature $Tg$ or the melting temperature $Tf$ of the thermoplastic material, wherein the diameter of the axially drawn tube at the second temperature is subsequently increased or (b) low enough to interrupt the axial drawing step and to fix the diameter of the axially drawn tube at a generally predetermined diameter.

3. The method according to claim 2, in which the thermoplastic material is extruded at an extrusion temperature and the change in temperature from the extrusion temperature to the second temperature is between about 30° to 150° C.

4. The method according to claim 2, in which the thermoplastic material is extruded at an extrusion temperature and the change in temperature from the extrusion temperature to the second temperature is between about 45° to 100° C.

5. The method according to claim 2, in which the cooling apparatus includes an external air or water projection.

6. The method according to claim 2, in which the cooling apparatus comprises a ring cooled with air or water.

7. The method according to claim 6, in which the ring includes a part with diameter equal to about $D0$ so as to form a calibration ring from which a tube having a diameter of about $D0$ exits.

8. The method according to claim 2, in which the cooling means includes air or water projection provided inside the axially drawn tube.

9. The method according to claim 2, in which the diameter of the drawn tube is increased using a radial expansion assembly that includes a radial expansion chamber provided with an inner wall having a diameter equal to about $D2$ and an expansion area for increasing the diameter of the axially drawn tube from $D1$ to $D2$.

10. The method according to claim 9, in which the radial expansion device includes an entry ring with diameter of about $D1$ to provide the axially drawn tube with a diameter $D1$ before radial expansion of the axially drawn tube.

11. The method according to claim 10, in which the entry ring forms an annular chamber with an inner surface having an inner diameter $D1$, the inner surface comprising a plurality of orifices for providing a vacuum, the annular chamber being put under a pressure $Pa$ less than atmospheric pressure P, wherein the axially drawn tube is pushed into contact with the inner surface.

12. The method according to claim 1, in which the diameter of the drawn tube is increased by (a) maintaining the inside of the drawn tube under pressure or (b) maintaining the outside of the drawn tube under negative pressure.

13. The method according to claim 12, in which the diameter of the drawn tube is increased by maintaining the drawn tube under a vacuum.

14. The method according to claim 13, in which the inner wall of the radial expansion assembly is a tubular metallic wall capable of allowing air to pass through.

15. The method according to claim 13, in which the inner wall of the radial expansion assembly is surface treated.

16. The method according to claim 1, in which the increase of the diameter from $D1$ to $D2$ is at least about 10 mm, and the increase of the diameter occurring over a distance $L1$ less than about 250 mm.

17. The method according to claim 1, further including cooling the radially-expanded tube in an auxiliary cooling assembly to a temperature $T2$ between 10° C. and 60° C.

18. The method according to claim 1, in which the thermoplastic material is extruded using a die having a diameter $D0$ between about 20 mm to 50 mm and thickness $E0$ between about 0.5 mm to 3 mm.

19. The method according to claim 18, in which the thermoplastic material passes through the die at a rate of about 10 kg to 100 kg per hour.

20. The method according to claim 1, in which the diameter $D1$ of the axially drawn tube is between about 5 mm to 20 mm and the thickness $E1$ is between about 0.2 mm to 0.6 mm, the ratio of $D1/D0$ being no more than about 0.6 and the ratio of $E1/E0$ being no more than about 0.6.

21. The method according to claim 1, in which the diameter $D2$ of the radially-expanded tube is between about 20 mm to 50 mm and the thickness $E2$ is between about 0.05 mm to 0.35 mm, the ratio $D2/D1$ being no more than about 2 and the ratio of $E2/E1$ being no more than about 0.6.

22. The method according to claim 2, in which a radial expansion assembly is positioned at a distance L from a die for extruding the thermoplastic material, the radial expansion assembly being generally free to move in an axial direction, the distance L selected to provide a sufficient degree of axial drawing and cooling of the axially drawn tube.

23. The method according to claim 22, in which the cooling assembly is positioned at a distance L0<L from the die.

24. The method according to claim 23 in which the radial expansion assembly includes an annular chamber under a vacuum at pressure Pa, and in which a change in the pressure Pa results in displacement of the cooling assembly by a distance ΔL0, wherein any increase in pressure Pa causing a decrease in the diameter D1 of the axially drawn tube being corrected by a negative displacement ΔL0 sufficient to increase the diameter of the axially drawn tube to D1.

25. The method according to claim 23, in which the displacement ΔL0 is controlled by an increase in an axial tension force Ft applied by the axial tension assembly, and in which the increase in the axial tension force Ft is corrected by a positive displacement ΔL0 sufficient to reduce the diameter of the axially drawn tube to D1.

26. The method according to claim 1, in which the thermoplastic material comprises at least one first thermoplastic material with a glass transition temperature Tg equal to at least 40° C., the at least one first thermoplastic material selected from the group consisting of PET, PVC, PS, PMMA, copolymers thereof, and combinations thereof.

27. The method according to claim 26, in which the thermoplastic material includes at least one second thermoplastic material with a glass transition temperature Tg less than 50° C., the at least one second thermoplastic material selected from the group consisting of polyolefins, ethylene copolymers, ethylene and propylene copolymers, thermoplastic elastomers, and combinations thereof.

28. The method according to claim 27, in which the thermoplastic material includes a mixture of the first thermoplastic material and the second thermoplastic material, the mixture including at least 50% by volume of the first thermoplastic material and between 10 to 50% by volume of the second thermoplastic material.

29. The method according to claim 27 in which the thermoplastic material includes a multi-layer material, the multi-layer material comprising a first layer composed of the first thermoplastic material and a second layer composed of the second thermoplastic material.

30. The method according to claim 29, in which the multi-layer material includes an internal adhesive layer.

31. The method according to claim 1, in which the thermoplastic material includes a micronized filler selected from the group consisting of talc, calcium carbonate, barium sulphate, titanium oxide, organic or mineral pigments, nanoparticle clays, and combinations thereof to color the thermoplastic material.

32. The method according to claim 1, in which the length of the tube portions is about the height H of the cap and in which a disc with a flat or curved edge is provided to form the head of the cap, the disc being assembled with the cap blank.

33. The method according to claim 32, in which the disc is obtained by cutting a sheet material of a material selected from the group consisting of plastics, metal strips or sheets, paper or cardboard, or multi-layer assemblies of these materials.

34. The method according to claim 33, in which the disc includes a system for identifying the cap for monitoring packaged products and providing an anti-fraud and anti-theft assembly.

35. The method according to claim 33, in which the disc is an excise disc.

36. The method according to claim 32, in which an insert comprising a head and a skirt is provided with the tube portion, the insert being placed at an upper end of the mandrel, prior to heat shrinking of the tube portion to assemble the insert and the heat-shrunk cap blank.

37. The method according to claim 36, in which the insert comprises a thread and is provided with a sealing means for forming a cap.

38. The method according to claim 1, in which the length of the tube portion is greater than the height of the cap, the tube portion comprising a lower part for forming the skirt of the cap and an upper part for forming the head of the cap, the head being formed by compressing the upper part between a die and a head of the mandrel.

39. The method according to claim 38, in which the head is formed simultaneously with assembly of an auxiliary part introduced into the mold before compressing, the auxiliary part forming a pattern, an illustration or an excise means.

40. The method according to claim 1, in which a printing is formed on at least one of the tube portion, the skirt, the head, and the heat-shrunk cap blank.

41. The method according to claim 40, in which inks that can be cross-linked by radiation are used for the printing and the printing is formed at a temperature below the temperature at which the cap shrinks.

42. The method according to claim 40, in which the printing is formed using an ink jet printer.

43. The method according to claim 40, in which the printing is formed by a transfer comprising a plurality of printing nozzles in parallel along an axial direction or height H, the plurality having a nozzle density of at least 1 nozzle per mm.

44. The method according to claim 1, in which at least a portion of the thermoplastic material is colored through the depth of the material.

45. The method according to claim 30 in which the multi-layer material includes an outside layer made of a plastic material that can be printed on to provide an illustration bonded to the outside layer.

46. The method according to claim 1, in which the skirt includes an easy opening means.

47. The method according to claim 1, in which the axial tension assembly includes two driving rollers or two belt type pullers.

48. The method according to claim 1, in which step (a)-(e) are performed continuously.

49. The method according to claim 1, in which the annular vacuum chamber is configured to maintain a pressure less than atmospheric pressure outside the tube.

* * * * *